(12) United States Patent
Sylvester et al.

(10) Patent No.: US 12,157,832 B2
(45) Date of Patent: Dec. 3, 2024

(54) ELECTRODEPOSITABLE COATING COMPOSITION INCLUDING A PHYLLOSILICATE PIGMENT AND A DISPERSING AGENT

(71) Applicant: PPG Industries Ohio, Inc., Cleveland, OH (US)

(72) Inventors: Kevin T. Sylvester, Pittsburgh, PA (US); Egle Puodziukynaite, Allison Park, PA (US); Corey J. Dedomenic, Monroeville, PA (US); Kevin A. O'Neil, Boardman, OH (US); Richard F. Karabin, Ruffs Dale, PA (US); Silvia Bezer, Gibsonia, PA (US); Christopher A. Dacko, Pittsburgh, PA (US); Kelly L. Moore, Dunbar, PA (US); Mark L. Follet, Allison Park, PA (US); Jonathan G. Weis, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 17/757,540

(22) PCT Filed: Dec. 18, 2020

(86) PCT No.: PCT/US2020/065835
§ 371 (c)(1),
(2) Date: Jun. 16, 2022

(87) PCT Pub. No.: WO2021/127327
PCT Pub. Date: Jun. 24, 2021

(65) Prior Publication Data
US 2023/0044601 A1    Feb. 9, 2023

Related U.S. Application Data

(60) Provisional application No. 62/951,693, filed on Dec. 20, 2019.

(51) Int. Cl.
| | | |
|---|---|---|
| *C08K 9/04* | (2006.01) | |
| *C08G 18/58* | (2006.01) | |
| *C08G 18/80* | (2006.01) | |
| *C09D 5/44* | (2006.01) | |
| *C09D 7/20* | (2018.01) | |
| *C09D 7/45* | (2018.01) | |
| *C09D 7/62* | (2018.01) | |

(52) U.S. Cl.
CPC ......... *C09D 5/4492* (2013.01); *C08G 18/584* (2013.01); *C08G 18/80* (2013.01); *C08K 9/04* (2013.01); *C09D 5/4465* (2013.01); *C09D 5/4476* (2013.01); *C09D 7/20* (2018.01); *C09D 7/45* (2018.01); *C09D 7/62* (2018.01)

(58) Field of Classification Search
CPC .. C09D 5/4992; C09D 5/4465; C09D 5/4476; C09D 7/20; C09D 7/45; C09D 7/62; C09D 7/61; C09D 7/63; C09D 5/448; C09D 175/08; C08G 18/584; C08G 18/80; C08G 18/003; C08G 18/0852; C08G 18/10; C08G 18/222; C08G 18/246; C08G 18/3215; C08G 18/3275; C08G 18/4879; C08G 18/6674; C08G 18/6688; C08G 18/7664; C08G 18/48; C08K 9/04; C08K 3/346; C08K 2003/329; C25D 13/22
USPC ........................................................ 523/209
See application file for complete search history.

(56) References Cited

U.S. PATENT DOCUMENTS

| | | |
|---|---|---|
| 3,362,899 A | 1/1968 | Gilchrist |
| 3,455,806 A | 7/1969 | Spoor et al. |
| 3,491,011 A | 1/1970 | Bras et al. |
| 3,522,163 A | 7/1970 | Hartzell et al. |
| 3,594,339 A | 7/1971 | Palaika |
| 3,598,774 A | 8/1971 | Hartzell et al. |
| 3,699,030 A | 10/1972 | Gilchrist |
| 3,793,278 A | 2/1974 | Bona |
| 3,928,157 A | 12/1975 | Suematsu et al. |
| 3,937,679 A | 2/1976 | Bosso et al. |
| 3,947,338 A | 3/1976 | Jerabek et al. |
| 3,962,165 A | 6/1976 | Bosso et al. |
| 3,975,346 A | 8/1976 | Bosso et al. |
| 3,984,299 A | 10/1976 | Jerabek |
| 4,001,156 A | 1/1977 | Bosso et al. |
| 4,031,050 A | 6/1977 | Jerabek |
| 4,104,147 A | 8/1978 | Marchetti et al. |
| 4,115,227 A | 9/1978 | Hazan |

(Continued)

FOREIGN PATENT DOCUMENTS

| | | |
|---|---|---|
| CA | 2080144 | 4/1993 |
| CA | 2892655 | 6/2014 |

(Continued)

OTHER PUBLICATIONS

International Search Report and Written Opinion received for PCT Application Serial No. PCT/US2020/065835 dated Apr. 30, 2021, 9 pages.

*Primary Examiner* — Hannah J Pak
(74) *Attorney, Agent, or Firm* — Charles M. Yeomans

(57) ABSTRACT

The present invention is directed towards an electrodepositable coating composition comprising a cationic electrodepositable binder; a phyllosilicate pigment; and a dispersing agent. Also disclosed are methods of making the electrodepositable coating composition, coatings derived therefrom, and substrates coated with the coatings derived from the electrodepositable coating composition.

22 Claims, No Drawings

(56) References Cited

U.S. PATENT DOCUMENTS

| | | |
|---|---|---|
| 4,137,213 A | 1/1979 | Kempter et al. |
| 4,308,121 A | 12/1981 | Hazan |
| 4,388,435 A | 6/1983 | Loch |
| 4,410,657 A | 10/1983 | Loch |
| 4,432,850 A | 2/1984 | Moriarity et al. |
| 4,452,963 A | 6/1984 | Moriarity |
| 4,755,418 A | 7/1988 | Debroy et al. |
| 4,793,867 A | 12/1988 | Charles et al. |
| 4,812,215 A | 3/1989 | Karabin et al. |
| 5,074,979 A | 12/1991 | Valko et al. |
| 5,104,583 A | 4/1992 | Richardson |
| 5,203,975 A | 4/1993 | Richardson |
| 5,221,700 A | 6/1993 | Gilbert et al. |
| 5,389,406 A | 2/1995 | Doebler et al. |
| 5,464,887 A * | 11/1995 | Scott .............. C09D 5/448 523/403 |
| 5,530,043 A | 6/1996 | Zawacky et al. |
| 5,578,669 A | 11/1996 | Odawa et al. |
| 5,588,989 A | 12/1996 | Vonk et al. |
| 5,965,000 A | 10/1999 | Klein |
| 6,017,432 A | 1/2000 | Boyd et al. |
| 6,093,298 A | 7/2000 | Kaylo et al. |
| 6,200,447 B1 | 3/2001 | Bruecken et al. |
| 6,569,921 B1 | 5/2003 | Klein |
| 7,005,051 B2 | 2/2006 | Kojima et al. |
| 7,494,716 B2 | 2/2009 | Ehmann et al. |
| 7,497,936 B2 | 3/2009 | Eswarakrishnan et al. |
| 7,749,368 B2 | 7/2010 | Mcmurdie et al. |
| 7,842,762 B2 | 11/2010 | Zawacky et al. |
| 8,197,654 B2 | 6/2012 | Hickenboth et al. |
| 8,236,157 B2 | 8/2012 | Gebregiorgis |
| 8,362,300 B2 | 1/2013 | Pritschins et al. |
| 8,673,091 B2 | 3/2014 | Mcmillen et al. |
| 8,937,117 B2 | 1/2015 | Nakazawa et al. |
| 10,697,081 B2 | 6/2020 | Bezer et al. |
| 2002/0056642 A1* | 5/2002 | Ikenoue .......... C08G 18/4263 428/422.8 |
| 2003/0005419 A1 | 3/2003 | McCollum et al. |
| 2003/0054193 A1 | 3/2003 | Mccollum et al. |
| 2004/0026248 A1 | 2/2004 | Uchidoni et al. |
| 2004/0069637 A1* | 4/2004 | Eswarakrishnan .......... C08G 18/0814 204/489 |
| 2005/0279254 A1 | 12/2005 | Toi et al. |
| 2007/0170401 A1* | 7/2007 | Hsu .............. H01B 1/122 252/500 |
| 2008/0021810 A1 | 1/2008 | Pappas et al. |
| 2008/0183216 A1 | 7/2008 | Jackson |
| 2008/0190769 A1 | 8/2008 | Schuster et al. |
| 2008/0210570 A1 | 9/2008 | Schuster et al. |
| 2008/0242582 A1* | 10/2008 | SenGupta .......... A61K 8/062 510/417 |
| 2009/0111916 A1 | 4/2009 | Eswarakrishnan et al. |
| 2010/0163420 A1 | 7/2010 | Weiss et al. |
| 2013/0344310 A1* | 12/2013 | Wasserfallen ........ C25D 13/00 427/372.2 |
| 2020/0399479 A1 | 12/2020 | Zawacky et al. |
| 2023/0143426 A1* | 5/2023 | Visser .............. C09D 5/4473 429/209 |

FOREIGN PATENT DOCUMENTS

| | | |
|---|---|---|
| CN | 1551907 A | 12/2004 |
| CN | 111670226 A | 9/2020 |
| DE | 3018715 A1 | 11/1981 |
| DE | 19623962 C5 | 12/2005 |
| EP | 0090225 A3 | 4/1984 |
| GB | 1161890 A | 8/1969 |
| GB | 1164154 A | 9/1969 |
| JP | H09314049 A2 | 12/1997 |
| JP | H11286631 A2 | 10/1999 |
| JP | 2002-069358 A2 | 3/2002 |
| JP | 2009-227820 A2 | 10/2009 |
| KR | 100416041 B1 | 1/2004 |
| KR | 100576404 B1 | 12/2006 |
| WO | 200202849 A2 | 1/2002 |
| WO | 2002002849 A2 | 1/2002 |
| WO | WO2013047319 A1 | 4/2013 |

* cited by examiner

ELECTRODEPOSITABLE COATING COMPOSITION INCLUDING A PHYLLOSILICATE PIGMENT AND A DISPERSING AGENT

FIELD OF THE INVENTION

The present invention is directed towards an electrodepositable coating composition, coatings derived therefrom, and methods of applying such coatings.

BACKGROUND INFORMATION

Electrodeposition as a coating application method involves deposition of a film-forming composition onto a conductive substrate under the influence of an applied electrical potential. Electrodeposition has become standard in the coatings industry because, by comparison with non-electrophoretic coating means, electrodeposition offers increased paint utilization with less waste, improved corrosion protection to the substrate, and minimal environmental contamination.

Electrodepositable coatings typically contain pigments that serve numerous purposes, and pigmented electrodeposition baths are typically supplied as two components: (i) a resin blend and (ii) a pigment paste. The pigment paste includes pigment and a grinding resin or grinding vehicle. The pigment and resin are usually ground together by a milling process in order to disperse the pigment into the grinding resin to form the pigment paste. The use of a grinding vehicle reduces pigment agglomeration and allows for homogeneous dispersion of the pigment into the coating bulk, but it involves additional manufacturing and formulation steps at a higher cost. It also makes it difficult to incorporate a high level of pigment into the coating and weakens the corrosion barrier properties of the coating by lowering the pigment-to-binder (P:B) ratio and crosslink density of the coating.

There remains a need in the coatings industry for a cost effective electrodepositable compositions that allow for higher pigment loadings to provide improved corrosion resistance to a metal substrate.

SUMMARY OF THE INVENTION

Disclosed is a cationic electrodepositable coating composition comprising a cationic electrodepositable binder; and a phyllosilicate pigment-dispersing agent complex, wherein the complex has an anionic charge.

The present invention also discloses a cationic electrodepositable coating composition comprising a cationic electrodepositable binder comprising a cationic salt group-containing, film-forming polymer; a phyllosilicate pigment; and a dispersing agent, wherein the cationic electrodepositable coating composition is formed by the method comprising the steps of (1) heating an unneutralized cationic salt forming group-containing, film-forming polymer to an elevated temperature; (2) adding the dispersing agent to the unneutralized cationic salt forming group-containing, group-containing, film-forming binder comprising the cationic film-forming polymer with agitation to form a mixture; (3) adding the phyllosilicate pigment to the mixture at elevated temperature with agitation; and (4) dispersing the mixture of the cationic salt forming group-containing, film-forming polymer, the phyllosilicate pigment, and dispersing agent into an aqueous medium comprising water and a resin neutralizing acid with agitation, wherein cationic salt forming groups in the cationic salt forming group-containing, film-forming polymer are neutralized by the resin neutralizing acid to form a cationic salt group-containing film forming polymer.

The present invention also discloses a method of making an electrodepositable coating composition, the method comprising the steps of (1) heating an unneutralized cationic film-forming binder comprising a cationic salt forming group-containing, film-forming polymer to an elevated temperature; (2) adding the dispersing agent to the unneutralized cationic salt forming group-containing, film-forming polymer with agitation to form a mixture; (3) adding the phyllosilicate pigment to the mixture at elevated temperature with agitation; and (4) dispersing the mixture of the cationic salt forming group-containing, film-forming polymer, the phyllosilicate pigment, and the dispersing agent into an aqueous medium comprising water and a resin neutralizing acid with agitation, wherein cationic salt forming groups in the cationic salt forming group-containing, film-forming polymer are neutralized by the resin neutralizing acid to form a cationic salt group-containing film forming polymer.

The present invention further discloses a method for coating a substrate comprising electrodepositing a coating derived from the cationic electrodepositable coating composition of the present invention onto at least a portion of the substrate.

The present invention also discloses a substrate that is coated, at least in part, with a coating deposited from the cationic electrodepositable coating composition of the present invention.

DETAILED DESCRIPTION OF THE INVENTION

The present invention is directed to cationic electrodepositable coating composition comprising, consisting essentially of, or consisting of cationic electrodepositable coating composition comprising a cationic electrodepositable binder; a phyllosilicate pigment; and a dispersing agent.

As used herein, the term "electrodepositable coating composition" refers to a composition that is capable of being deposited onto an electrically conductive substrate under the influence of an applied electrical potential. The term "cationic electrodepositable coating composition" refers to an electrodepositable coating composition capable of being deposited onto an electrically conductive substrate by a cationic electrodeposition process, wherein a coating deposited from the cationic electrodepositable coating composition deposits on the conductive substrate serving as the cathode during the electrodeposition process.

Cationic Electrodepositable Binder

According to the present invention, the cationic electrodepositable coating composition comprises a cationic electrodepositable binder.

As used herein, the term "cationic electrodepositable binder" refers to an organic film-forming polymer that includes cationic salt groups or cationic salt-forming groups (that may be at least partially neutralized to form cationic salt groups) that impart a positive charge to the polymer and that enable the polymer to be deposited onto a conductive substrate by a cationic electrodeposition process.

The cationic electrodepositable binder may comprise cationic salt group containing film-forming polymer and, optionally, a curing agent.

As stated above, the cationic electrodepositable binder comprises a cationic salt group-containing film-forming polymer. The cationic salt group-containing film-forming polymer may be used in a cationic electrodepositable coating composition. As used herein, the term "cationic salt group-containing film-forming polymer" refers to polymers that include at least partially neutralized cationic salt groups, such as sulfonium groups, ammonium groups, or phosphonium groups, that impart a positive charge.

The cationic salt group-containing film-forming polymer comprises functional groups. The functional groups of the cationic salt group-containing film-forming polymer may comprise active hydrogen functional groups. The term "active hydrogen" refers to hydrogens which, because of their position in the molecule, display activity according to the Zerewitinoff test, as described in the JOURNAL OF THE AMERICAN CHEMICAL SOCIETY, Vol. 49, page 3181 (1927). Accordingly, active hydrogens include hydrogen atoms attached to oxygen, nitrogen, or sulfur, and thus useful compounds will include those having at least two hydroxyl, thiol, primary amine, and/or secondary amine groups (in any combination). Cationic salt group-containing film-forming polymers that comprise active hydrogen functional groups may be referred to as active hydrogen-containing, cationic salt group-containing film-forming polymers.

Examples of polymers that are suitable for use as the cationic salt group-containing film-forming polymer in the present invention include, but are not limited to, alkyd polymers, acrylics, polyepoxides, polyamides, polyurethanes, polyureas, polyethers, and polyesters, among others.

More specific examples of suitable active hydrogen-containing, cationic salt group containing film-forming polymers include polyepoxide-amine adducts, such as the adduct of a polyglycidyl ethers of a polyphenol, such as Bisphenol A, and primary and/or secondary amines, such as are described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. A portion of the amine that is reacted with the polyepoxide may be a ketimine of a polyamine, as is described in U.S. Pat. No. 4,104,147 at col. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and 3,928,157 at col. 2, line 29 to col. 3, line 21, these portions of both of which are incorporated herein by reference, may be used.

Besides amine salt group-containing resins, quaternary ammonium salt group-containing resins may also be employed as a cationic salt group-containing film-forming polymer in the present invention. Examples of these resins are those which are formed from reacting an organic polyepoxide with a tertiary amine acid salt. Such resins are described in U.S. Pat. No. 3,962,165 at col. 2, line 3 to col. 11, line 7; U.S. Pat. No. 3,975,346 at col. 1, line 62 to col. 17, line 25 and U.S. Pat. No. 4,001,156 at col. 1, line 37 to col. 16, line 7, these portions of which being incorporated herein by reference.

Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Patent Application No. 12463B1 at pg. 2, line 1 to pg. 6, line 25, this portion of which being incorporated herein by reference, may also be employed.

Other suitable cationic salt group-containing film-forming polymers include those that may form photodegradation resistant electrodepositable coating compositions. Such polymers include the polymers comprising cationic amine salt groups which are derived from pendant and/or terminal amino groups that are disclosed in U.S. Patent Application Publication No. 2003/0054193 A1 at paragraphs [0064] to [0088], this portion of which being incorporated herein by reference. Also suitable are the active hydrogen-containing, cationic salt group-containing resins derived from a polyglycidyl ether of a polyhydric phenol which are bonded more than one aromatic group, which are described in U.S. Patent Application Publication No. 2003/0054193 A1 at paragraphs [0096] to [0123], this portion of which being incorporated herein by reference. Also suitable are polypropylene oxide diepoxide resins, such as DER-732 commercially available from Palmer Holland.

The active hydrogen-containing, cationic salt group-containing film-forming polymer is made cationic and water dispersible by at least partial neutralization with a neutralizing acid. Suitable neutralizing acids include organic and inorganic acids. Non-limiting examples of suitable organic neutralizing acids include formic acid, acetic acid, methanesulfonic acid, and lactic acid. Non-limiting examples of suitable inorganic neutralizing acids include a sulfamic acid. By "sulfamic acid" is meant sulfamic acid itself or derivatives thereof such as those having the formula:

wherein R is hydrogen or an alkyl group having 1 to 4 carbon atoms. Mixtures of the above-mentioned acids also may be used in the present invention.

The extent of neutralization of the cationic salt group-containing film-forming polymer may vary with the particular polymer involved. However, sufficient neutralizing acid should be used to sufficiently neutralize the cationic salt group-containing film-forming polymer such that the cationic salt group-containing film-forming polymer may be dispersed in an aqueous dispersing medium. For example, the amount of neutralizing acid used may provide at least 20% of all of the total theoretical neutralization. Excess neutralizing acid may also be used beyond the amount required for 100% total theoretical neutralization. For example, the amount of neutralizing acid used to neutralize the cationic salt group-containing film-forming polymer may be ≥0.1% based on the total amines in the active hydrogen-containing, cationic salt group-containing film-forming polymer. Alternatively, the amount of neutralizing acid used to neutralize the active hydrogen-containing, cationic salt group-containing film-forming polymer may be ≤100% based on the total amines in the active hydrogen-containing, cationic salt group-containing film-forming polymer. The total amount of neutralizing acid used to neutralize the cationic salt group-containing film-forming polymer may range between any combination of values, which were recited in the preceding sentences, inclusive of the recited values. For example, the total amount of neutralizing acid used to neutralize the active hydrogen-containing, cationic salt group-containing film-forming polymer may be 20%, 35%, 50%, 60%, or 80% based on the total amines in the cationic salt group-containing film-forming polymer. Other acidic additives may be incorporated into the electrodepositable compositions leading to an increase in the total theoretical neutralization relative to just amount added with the neutralizing acid. When these acidic additives are present in the composition, the total theoretical neutralization (% TN) may be 60% to 250% TN, such as 65% to 200% TN, such as 70% to 175% TN, such as 75% to 150% TN.

According to the present invention, the cationic salt group-containing film-forming polymer may be present in the cationic electrodepositable coating composition in an amount of at least 40% by weight, such as at least 50% by weight, such as at least 60% by weight, such as at least 64% by weight, such as at least 66% by weight and may be present in the in an amount of no more than 90% by weight, such as no more than 80% by weight, such as no more than 77% by weight, such as no more than 74% by weight, such as no more than 72% by weight based on the total weight of the resin solids of the cationic electrodepositable coating composition. The cationic salt group-containing film-forming polymer may be present in the cationic electrodepositable coating composition in an amount of 40% to 90% by weight, such as 50% to 80% by weight, such as 60% to 77% by weight, such as 64% to 74% by weight, such as 66% to 72% by weight, based on the total weight of the resin solids of the cationic electrodepositable coating composition.

According to the present invention, the cationic electrodepositable binder of the cationic electrodepositable coating composition of the present invention may optionally further comprise a curing agent. The curing agent is reactive with functional groups on the film-forming polymer. For example, the curing agent may react with the reactive groups, such as active hydrogen groups, of the cationic salt group-containing film-forming polymer to effectuate cure of the coating composition to form a coating. As used herein, the term "cure", "cured" or similar terms, as used in connection with the cationic electrodepositable coating compositions described herein, means that at least a portion of the components that form the cationic electrodepositable coating composition are crosslinked to form a coating. Additionally, curing of the cationic electrodepositable coating composition refers to subjecting said composition to curing conditions (e.g., elevated temperature) leading to the reaction of the reactive functional groups of the components of the cationic electrodepositable coating composition, and resulting in the crosslinking of the components of the composition and formation of an at least partially cured coating. Non-limiting examples of suitable curing agents are at least partially blocked polyisocyanates, aminoplast resins and phenoplast resins, such as phenolformaldehyde condensates including allyl ether derivatives thereof.

Suitable at least partially blocked polyisocyanates include aliphatic polyisocyanates, aromatic polyisocyanates, and mixtures thereof. The curing agent may comprise an at least partially blocked aliphatic polyisocyanate. Suitable at least partially blocked aliphatic polyisocyanates include, for example, fully blocked aliphatic polyisocyanates, such as those described in U.S. Pat. No. 3,984,299 at col. 1 line 57 to col. 3 line 15, this portion of which is incorporated herein by reference, or partially blocked aliphatic polyisocyanates that are reacted with the polymer backbone, such as is described in U.S. Pat. No. 3,947,338 at col. 2 line 65 to col. 4 line 30, this portion of which is also incorporated herein by reference. By "blocked" is meant that the isocyanate groups have been reacted with a compound such that the resultant blocked isocyanate group is stable to active hydrogens at ambient temperature (i.e., about 23° C. and atmospheric pressure) but reactive with active hydrogens in the film forming polymer at elevated temperatures, such as between 90° C. and 200° C. The polyisocyanate curing agent may be a fully blocked polyisocyanate with substantially no free isocyanate groups.

The polyisocyanate curing agent may comprise a diisocyanate, higher functional polyisocyanates or combinations thereof. For example, the polyisocyanate curing agent may comprise aliphatic and/or aromatic polyisocyanates. Aliphatic polyisocyanates may include (i) alkylene isocyanates, such as trimethylene diisocyanate, tetramethylene diisocyanate, pentamethylene diisocyanate, hexamethylene diisocyanate ("HDI"), 1,2-propylene diisocyanate, 1,2-butylene diisocyanate, 2,3-butylene diisocyanate, 1,3-butylene diisocyanate, ethylidene diisocyanate, and butylidene diisocyanate, and (ii) cycloalkylene isocyanates, such as 1,3-cyclopentane diisocyanate, 1,4-cyclohexane diisocyanate, 1,2-cyclohexane diisocyanate, isophorone diisocyanate, methylene bis(4-cyclohexylisocyanate) ("HMDI"), the cyclo-trimer of 1,6-hexmethylene diisocyanate (also known as the isocyanurate trimer of HDI, commercially available as Desmodur N3300 from Convestro AG), and meta-tetramethylxylylene diisocyanate (commercially available as TMXDI® from Allnex SA). Aromatic polyisocyanates may include (i) arylene isocyanates, such as m-phenylene diisocyanate, p-phenylene diisocyanate, 1,5-naphthalene diisocyanate and 1,4-naphthalene diisocyanate, and (ii) alkarylene isocyanates, such as 4,4'-diphenylene methane ("MDI"), 2,4-tolylene or 2,6-tolylene diisocyanate ("TDI"), or mixtures thereof, 4,4-toluidine diisocyanate and xylylene diisocyanate. Triisocyanates, such as triphenyl methane-4, 4',4"-triisocyanate, 1,3,5-triisocyanato benzene and 2,4,6-triisocyanato toluene, tetraisocyanates, such as 4,4'-diphenyldimethyl methane-2,2',5,5'-tetraisocyanate, and polymerized polyisocyanates, such as tolylene diisocyanate dimers and trimers and the like, may also be used. The curing agent may comprise a blocked polyisocyanate selected from a polymeric polyisocyanate, such as polymeric HDI, polymeric MDI, polymeric isophorone diisocyanate, and the like. The curing agent may also comprise a blocked trimer of hexamethylene diisocyanate available as Desmodur N3300® from Covestro AG. Mixtures of polyisocyanate curing agents may also be used.

The polyisocyanate curing agent may be at least partially blocked with at least one blocking agent selected from a 1,2-alkane diol, for example 1,2-propanediol; a 1,3-alkane diol, for example 1,3-butanediol; a benzylic alcohol, for example, benzyl alcohol; an allylic alcohol, for example, allyl alcohol; caprolactam; a dialkylamine, for example dibutylamine; and mixtures thereof. The polyisocyanate curing agent may be at least partially blocked with at least one 1,2-alkane diol having three or more carbon atoms, for example 1,2-butanediol.

Other suitable blocking agents include aliphatic, cycloaliphatic, or aromatic alkyl monoalcohols or phenolic compounds, including, for example, lower aliphatic alcohols, such as methanol, ethanol, and n-butanol; cycloaliphatic alcohols, such as cyclohexanol; aromatic-alkyl alcohols, such as phenyl carbinol and methylphenyl carbinol; and phenolic compounds, such as phenol itself and substituted phenols wherein the substituents do not affect coating operations, such as cresol and nitrophenol. Glycol ethers and glycol amines may also be used as blocking agents. Suitable glycol ethers include ethylene glycol butyl ether, diethylene glycol butyl ether, ethylene glycol methyl ether and propylene glycol methyl ether. Other suitable blocking agents include oximes, such as methyl ethyl ketoxime, acetone oxime and cyclohexanone oxime.

For example, the blocking agent may comprise an ether or polyether comprising a hydroxyl group and a terminal group having the structure —O—R, wherein R is a $C_1$ to $C_4$ alkyl group, such as a $C_1$ to $C_3$ alkyl group, or two terminal hydroxyl groups. The polyether may comprise a homopolymer, block copolymer, or random copolymer. For example, the polyether may comprise a homopolymer of ethylene oxide or propylene oxide, or the polyether may comprise block or random copolymer comprising a combination of ethylene oxide and propylene oxide in a block or random pattern. Such organic solvents may comprise the structure. Such blocking groups may comprise the structure:

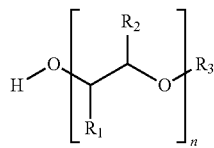

wherein $R_1$ and $R_2$ are each hydrogen or one of the $R_1$ and $R_2$ is hydrogen and the other is a methyl group; $R_3$ is H or a $C_1$ to $C_4$ alkyl group, such as a $C_1$ to $C_3$ alkyl group; and n is an integer from 1-50, such as from 1-40, such as from 1-30, such as from 1-20, such as from 1-12, such as from 1-8, such as from 1-6, such as from 1-4, such as from 2-50, such as from 2-40, such as from 2-30, such as from 2-20, such as from 2-12, such as from 2-8, such as from 2-6, such as from 2-4, such as from 3-50, such as from 3-40, such as from 3-30, such as from 3-20, such as from 3-12, such as from 3-8, such as from 3-6, such as from 3-4.

The curing agent may optionally comprise a high molecular weight volatile group. As used herein, the term "high molecular weight volatile group" refers to blocking agents and other organic byproducts that are produced and volatilized during the curing reaction of the electrodepositable coating composition having a molecular weight of at least 70 g/mol, such as at least 125 g/mol, such as at least 160 g/mol, such as at least 195 g/mol, such as at least 400 g/mol, such as at least 700 g/mol, such as at least 1000 g/mol, or higher, and may range from 70 to 1,000 g/mol, such as 160 to 1,000 g/mol, such as 195 to 1,000 g/mol, such as 400 to 1,000 g/mol, such as 700 to 1,000 g/mol. For example, the organic byproducts may include alcoholic byproducts resulting from the reaction of the film-forming polymer and an aminoplast or phenoplast curing agent, and the blocking agents may include organic compounds, including alcohols, used to block isocyanato groups of polyisocyanates that are unblocked during cure. For clarity, the high molecular weight volatile groups are covalently bound to the curing agent prior to cure, and explicitly exclude any organic solvents that may be present in the electrodepositable coating composition. Upon curing, the pigment-to-binder ratio of the deposited film may increase in the cured film relative to deposited uncured pigment-to-binder ratio in the electrodepositable coating composition because of the loss of a higher mass of the blocking agents and other organic byproducts derived from the curing agent that are volatilized during cure. High molecular weight volatile groups may comprise 5% to 50% by weight of the film-forming binder, such as 7% to 45% by weight, such as 9% to 40% by weight, such as 11% to 35%, such as 13% to 30%, based on the total weight of the film-forming binder. The high molecular weight volatile groups and other lower molecular weight volatile organic compounds produced during cure, such as lower molecular weight blocking agents and organic byproducts produced during cure, may be present in an amount such that the relative weight loss of the film-forming binder deposited onto the substrate relative to the weight of the film-forming binder after cure is an amount of 5% to 50% by weight of the film-forming binder, such as 7% to 45% by weight, such as 9% to 40% by weight, such as 11% to 35%, such as 13% to 30%, based on the total weight of the film-forming binder before and after cure.

The curing agent may comprise an aminoplast resin. Aminoplast resins are condensation products of an aldehyde with an amino- or amido-group carrying substance. Condensation products obtained from the reaction of alcohols and an aldehyde with melamine, urea or benzoguanamine may be used. However, condensation products of other amines and amides may also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2, 4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. Suitable aldehydes include formaldehyde, acetaldehyde, crotonaldehyde, acrolein, benzaldehyde, furfural, glyoxal and the like.

The aminoplast resins may contain methylol or similar alkylol groups, and at least a portion of these alkylol groups may be etherified by a reaction with an alcohol to provide organic solvent-soluble resins. Any monohydric alcohol may be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cellosolves and Carbitols, and halogen-substituted or other substituted alcohols, such as 3-chloropropanol and butoxyethanol.

Non-limiting examples of commercially available aminoplast resins are those available under the trademark CYMEL® from Allnex Belgium SA/NV, such as CYMEL 1130 and 1156, and RESIMENE® from INEOS Melamines, such as RESIMENE 750 and 753. Examples of suitable aminoplast resins also include those described in U.S. Pat. No. 3,937,679 at col. 16, line 3 to col. 17, line 47, this portion of which being hereby incorporated by reference. As is disclosed in the aforementioned portion of the '679 patent, the aminoplast may be used in combination with the methylol phenol ethers.

Phenoplast resins are formed by the condensation of an aldehyde and a phenol. Suitable aldehydes include formaldehyde and acetaldehyde. Methylene-releasing and aldehyde-releasing agents, such as paraformaldehyde and hexamethylene tetramine, may also be utilized as the aldehyde agent. Various phenols may be used, such as phenol itself, a cresol, or a substituted phenol in which a hydrocarbon radical having either a straight chain, a branched chain or a cyclic structure is substituted for a hydrogen in the aromatic ring. Mixtures of phenols may also be employed. Some specific examples of suitable phenols are p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain.

Aminoplast and phenoplast resins, as described above, are described in U.S. Pat. No. 4,812,215 at col. 6, line 20 to col. 7, line 12, the cited portion of which being incorporated herein by reference.

The curing agent may be present in the cationic electrodepositable coating composition in an amount of at least 10% by weight, such as at least 20% by weight, such as at least 25% by weight, and may be present in an amount of no more than 60% by weight, such as no more than 50% by weight, such as no more than 40% by weight, based on the total weight of the resin solids of the electrodepositable coating composition. The curing agent may be present in the cationic electrodepositable coating composition in an amount of 10% to 60% by weight, such as 20% to 50% by weight, such as 25% to 40% by weight, based on the total weight of the resin solids of the electrodepositable coating composition. As used herein, the weight attributed to the curing agent includes any blocking agents (including those that may be volatilized during cure).

Phyllosilicate Pigment and Dispersing Agent

According to the present invention, the cationic electrodepositable coating composition further comprises a phyllosilicate pigment and a dispersing agent.

As used herein, the term "phyllosilicate" refers to a group of minerals having sheets of silicates having a basic structure based on interconnected six membered rings of $SiO_4^{-4}$ tetrahedra that extend outward in infinite sheets where 3 out of the 4 oxygens from each tetrahedra are shared with other tetrahedra resulting in phyllosilicates having the basic structural unit of $Si_2O_5^{-2}$. Phyllosilicates may comprise hydroxide ions located at the center of the tetrahedra and/or cations such as, for example, $Fe^{+2}$, $Mg^{+2}$, or $Al^{+3}$, that form cation layers between the silicate sheets where the cations may coordinate with the oxygen of the silicate layer and/or the hydroxide ions. The term "phyllosilicate pigment" refers to pigment materials comprising phyllosilicates. Non-limiting examples of phyllosilicate pigments includes the micas, chlorites, serpentine, talc, and the clay minerals. The clay minerals include, for example, kaolin clay and smectite clay. The sheet-like structure of the phyllosilicate pigment tends to result in pigment having a plate-like structure, although the pigment can be manipulated (such as through mechanical means) to have other particle structures. These pigments when exposed to liquid media may or may not swell and may or may not have leachable components (e.g.: ions that may be drawn towards the liquid media and).

As discussed above, the phyllosilicate pigment may have a generally plate-like structure by nature of the sheet stacking structure of phyllosilicates. The surface, or face, of the plate-like phyllosilicate pigment may have a negative charge while the ends or edges of the plate may have a positive charge, and the phyllosilicate pigment as a whole generally has an overall negative charge. The overall charge of the phyllosilicate pigment may be dependent upon the pH of the medium in which it is dispersed. For example, kaolin clay may have an overall positive charge due to protonation of metal oxides and hydroxides at a pH of less than 2.2, and the magnitude of the negative charge increases above a pH of 2.2 up to 4.5 as acidic protons dissociate from the clay structure.

The phyllosilicate pigment may comprise a plate-like pigment. For example, the phyllosilicate pigment may comprise a plate-like mica pigment, a plate-like chlorite pigment, a plate-like serpentine pigment, a plate-like talc pigment, and/or a plate-like clay pigment. The plate-like clay pigment may comprise kaolin clay, smectite clay, or a combination thereof.

As used herein, the term "dispersing agent" refers to a material capable of forming a chemical complex with the phyllosilicate pigment and may assist in promoting dispersion of the phyllosilicate pigment.

The phyllosilicate pigment and dispersing agent may optionally form a complex, and the phyllosilicate pigment-dispersing agent complex of the present invention may optionally have an overall anionic charge. As used herein, the term "complex" refers to a substance formed by the chemical interaction, such as ionic bonding, covalent bonding, and/or hydrogen bonding, between two distinct chemical species. As used herein, the term "overall anionic charge" with respect to the complex means that the complex is at least partially negatively charged and may have some portions positively charged, but the negative charges are greater than the positive charges such that the complex has an anionic charged. These species will generally be part of a dispersion phase having one component or multiple components that is not soluble in the bulk media and other component(s) that are soluble in the bulk material.

The dispersing agent may comprise a dispersing acid. The dispersing acid may be a monoprotic acid or polyprotic acid. As used herein, the term "polyprotic acid" refers to chemical compounds having more than one acidic proton. As used herein, the term "acidic proton" refers to a proton that forms part of an acid group, including, but not limited to, oxyacids of phosphorus, carboxylic acids, oxyacids of sulfur, and the like.

The dispersing acid may comprise a first acidic proton having a pKa of at least 1.1, such as at least 1.5, such as at least 1.8. The dispersing acid may comprise a first acidic proton having a pKa of no more than 4.6, such as no more than 4.0, such as no more than 3.5. The dispersing acid may comprise a first acidic proton having a pKa of 1.1 to 4.6, such as 1.5 to 4.0, such as 1.8 to 3.5.

The dispersing acid may comprise a carboxylic acid, an oxyacid of phosphorus (such as phosphoric acid or phosphonic acid), or a combination thereof.

The dispersing acid may form a complex with the phyllosilicate pigment, and the phyllosilicate pigment-dispersing agent complex may comprise a phyllosilicate pigment-dispersing acid complex. The dispersing acid may deprotonate in the aqueous medium of the composition to form a negative (or more negative) charge, and the deprotonated acid dispersant may form a complex with the positively charged edges of the plate-like phyllosilicate pigment. The complex optionally may have an overall more negative charge than the phyllosilicate pigment does itself, i.e., the phyllosilicate pigment-dispersing agent complex may have an overall anionic charge.

The ratio of the weight of phyllosilicate pigment to moles of dispersing agent may be at least 0.25 g/mmol, such as at least 0.5 g/mmol, such as at least 1.0 g/mmol, such as at least 1.5 g/mmol, such as at least 1.75 g/mmol. The ratio of the weight of phyllosilicate pigment to moles of dispersing agent may be no more than 25 g/mmol, such as no more than 15 g/mmol, such as no more than 10 g/mmol, such as no more than 8.25 g/mmol, such as no more than 6.5 g/mmol, such as no more than 5.0 g/mmol. The ratio of the weight of phyllosilicate pigment to moles of dispersing agent may be in the amount of 0.25 to 25 g/mmol, such as 0.25 to 15 g/mmol, such as 0.25 to 10 g/mmol, such as 0.25 to 8.25 g/mmol, such as 0.25 to 6.5 g/mmol, such as 0.25 to 5.0 g/mmol, such as 0.5 to 25 g/mmol, such as 0.5 to 15 g/mmol, such as 0.5 to 10 g/mmol, such as 0.5 to 8.25 g/mmol, such as 0.5 to 6.5 g/mmol, such as 0.5 to 5.0 g/mmol, such as 1 to 25 g/mmol, such as 1 to 15 g/mmol, such as 1 to 10 g/mmol, such as 1 to 8.25 g/mmol, such as 1 to 6.5 g/mmol, such as 1 to 5.0 g/mmol, such as 1.5 to 25 g/mmol, such as 1.5 to 15 g/mmol, such as 1.5 to 10 g/mmol, such as 1.5 to 8.25 g/mmol, such as 1.5 to 6.5 g/mmol, such as 1.5 to 5.0 g/mmol, such as 1.75 to 25 g/mmol, such as 1.75 to 15 g/mmol, such as 1.75 to 10 g/mmol, such as 1.75 to 8.25 g/mmol, such as 1.75 to 6.5 g/mmol, such as 1.75 to 5.0 g/mmol.

The pigment-to-binder (P:B) ratio as set forth in this invention may refer to the weight ratio of the pigment-to-binder in the electrocoat bath composition, and/or the weight ratio of the pigment-to-binder in the deposited wet film, and/or the weight ratio of the pigment to the binder in the dry, uncured deposited film, and/or the weight ratio of the pigment-to-binder in the cured film. The pigment-to-binder (P:B) ratio of the phyllosilicate pigment to the cationic electrodepositable binder may be at least 0.20:1, such as at least 0.25:1, such as at least 0.30:1, such as at least 0.35:1, such as at least 0.40:1, such as at least 0.50:1, such as at least 0.60:1, such as at least 0.75:1, such as at least 1:1, such as at least 1.25:1, such as at least 1.5:1. The pigment-to-binder (P:B) ratio of the phyllosilicate pigment to the cationic electrodepositable binder may be no more than 2.0:1, such as no more than 1.75:1, such no more than 1.5:1, such as no more than 1.25:1, such as no more than 1:1, such as no more than 0.75:1, such as no more than 0.70:1, such as no more than 0.60:1, such as no more than 0.55:1, such as no more than 0.50:1. The pigment-to-binder (P:B) ratio of the phyllosilicate pigment to the cationic electrodepositable binder may be 0.2:1 to 2.0:1, such as 0.2:1 to 1.75:1, such as 0.2:1 to 1.50:1, such as 0.2:1 to 1.25:1, such as 0.2:1 to 1:1, such as 0.2:1 to 0.75:1, such as 0.2:1 to 0.70:1, such as 0.2:1 to 0.60:1, such as 0.2:1 to 0.55:1, such as 0.2:1 to 0.50:1, such as 0.25:1 to 2.0:1, such as 0.25:1 to 1.75:1, such as 0.25:1 to 1.50:1, such as 0.25:1 to 1.25:1, such as 0.25:1 to 1:1, such as 0.25:1 to 0.75:1, such as 0.25:1 to 0.70:1, such as 0.25:1 to 0.60:1, such as 0.25:1 to 0.55:1, such as 0.25:1 to 0.50:1, such as 0.3:1 to 2.0:1, such as 0.3:1 to 1.75:1, such as 0.3:1 to 1.50:1, such as 0.3:1 to 1.25:1, such as 0.3:1 to 1:1, such as 0.3:1 to 0.75:1, such as 0.3:1 to 0.70:1, such as 0.3:1 to 0.60:1, such as 0.3:1 to 0.55:1, such as 0.3:1 to 0.50:1, such as 0.35:1 to 2.0:1, such as 0.35:1 to 1.75:1, such as 0.35:1 to 1.50:1, such as 0.35:1 to 1.25:1, such as 0.35:1 to 1:1, such as 0.35:1 to 0.75:1, such as 0.35:1 to 0.70:1, such as 0.35:1 to 0.60:1, such as 0.35:1 to 0.55:1, such as 0.35:1 to 0.50:1, such as 0.4:1 to 2.0:1, such as 0.4:1 to 1.75:1, such as 0.4:1 to 1.50:1, such as 0.4:1 to 1.25:1, such as 0.4:1 to 1:1, such as 0.4:1 to 0.75:1, such as 0.4:1 to 0.70:1, such as 0.4:1 to 0.60:1, such as 0.4:1 to 0.55:1, such as 0.4:1 to 0.50:1, such as 0.5:1 to 2.0:1, such as 0.5:1 to 1.75:1, such as 0.5:1 to 1.50:1, such as 0.5:1 to 1.25:1, such as 0.5:1 to 1:1, such as 0.5:1 to 0.75:1, such as 0.5:1 to 0.70:1, such as 0.5:1 to 0.60:1, such as 0.5:1 to 0.55:1, such as 0.6:1 to 2.0:1, such as 0.6:1 to 1.75:1, such as 0.6:1 to 1.50:1, such as 0.6:1 to 1.25:1, such as 0.6:1 to 1:1, such as 0.6:1 to 0.75:1, such as 0.6:1 to 0.70:1, such as 0.75:1 to 2.0:1, such as 0.75:1 to 1.75:1, such as 0.75:1 to 1.50:1, such as 0.75:1 to 1.25:1, such as 0.75:1 to 1:1, such as 1:1 to 2.0:1, such as 1:1 to 1.75:1, such as 1:1 to 1.50:1, such as 1:1 to 1.25:1, such as 1.25:1 to 2.0:1, such as 1.25:1 to 1.75:1, such as 1.25:1 to 1.50:1, such as 1.50:1 to 2.0:1, such as 1.50:1 to 1.75:1.

The dispersing agent may be present in an amount of at least 0.1% by weight, such as at least 0.3% by weight, such as at least 0.5% by weight, such as at least 0.7% by weight, such as at least 0.8% by weight, such as 1% by weight, based on the total solids weight of the composition. The dispersing agent may be present in an amount of no more than 10% by weight, such as no more than 7.5% by weight, such as no more than 5% by weight, such as no more than 3% by weight, such as no more than 2% by weight, such as no more than 1.5% by weight, such as no more than 1% by weight, such as no more than 0.8% by weight, based on the total solids weight of the composition. The dispersing agent may be present in an amount of 0.1% to 10% by weight, such as 0.1% to 7.5% by weight, such as 0.1% to 5% by weight, such as 0.1% to 3% by weight, such as 0.1% to 2% by weight, such as 0.1% to 1.5% by weight, such as 0.1% to 1% by weight, such as 0.1% to 0.8% by weight, such as 0.3% to 10% by weight, such as 0.3% to 7.5% by weight, such as 0.3% to 5% by weight, such as 0.3% to 3% by weight, such as 0.3% to 2% by weight, such as 0.3% to 1.5% by weight, such as 0.3% to 1% by weight, such as 0.3% to 0.8% by weight, such as 0.5% to 10% by weight, such as 0.5% to 7.5% by weight, such as 0.5% to 5% by weight, such as 0.5% to 3% by weight, such as 0.5% to 2% by weight, such as 0.5% to 1.5% by weight, such as 0.5% to 1% by weight, such as 0.5% to 0.8% by weight, such as 0.7% to 10% by weight, such as 0.7% to 7.5% by weight, such as 0.7% to 5% by weight, such as 0.7% to 3% by weight, such as 0.7% to 2% by weight, such as 0.7% to 1.5% by weight, such as 0.7% to 1% by weight, such as 0.7% to 0.8% by weight, such as 0.8% to 10% by weight, such as 0.8% to 7.5% by weight, such as 0.8% to 5% by weight, such as 0.8% to 3% by weight, such as 0.8% to 2% by weight, such as 0.8% to 1.5% by weight, such as 0.8% to 1% by weight, such as 1% to 10% by weight, such as 1% to 7.5% by weight, such as 1% to 5% by weight, such as 1% to 3% by weight, such as 1% to 2% by weight, such as 1% to 1.5% by weight, such as 1% to 1% by weight, such as 1% to 0.8% by weight, based on the total solids weight of the composition.

The present invention is also directed to a cationic electrodepositable coating composition comprising a cationic electrodepositable binder comprising a cationic salt group-containing, film-forming polymer; a phyllosilicate pigment; and a dispersing agent, wherein the cationic electrodepositable coating composition is formed by the method comprising the steps of (1) heating an unneutralized cationic salt forming group-containing, film-forming polymer to an elevated temperature; (2) adding the dispersing agent to the unneutralized cationic salt forming group-containing, film-forming binder comprising the cationic film-forming polymer with agitation to form a mixture; (3) adding the phyllosilicate pigment to the mixture at elevated temperature with agitation; and (4) dispersing the mixture of the cationic salt forming group-containing, film-forming polymer, the phyllosilicate pigment, and dispersing agent into an aqueous medium comprising water and a resin neutralizing acid with agitation, wherein cationic salt forming groups in the cationic salt forming group-containing, film-forming polymer are neutralized by the resin neutralizing acid to form the cationic salt group-containing film forming polymer. The cationic binder may optionally further comprise a curing agent, and the curing agent may be added during or after any of steps 1 through 4. The phyllosilicate pigment and dispersing agent may optionally form a phyllosilicate pigment-dispersing agent complex, and/or the phyllosilicate pigment, dispersing agent, and cationic salt group-containing, film-forming polymer may optionally form a phyllosilicate pigment-dispersing agent-cationic salt group-containing, film-forming polymer complex.

Further Components of the Cationic Electrodepositable Coating Compositions

The cationic electrodepositable coating composition according to the present invention may optionally comprise one or more further components in addition to the cationic electrodepositable binder, the phyllosilicate pigment, and the dispersing agent described above.

According to the present invention, the cationic electrodepositable coating composition comprises an aqueous medium comprising water and optionally one or more organic solvent(s). The aqueous medium be present in amounts of, for example, 40% to 90% by weight, such as 50% to 75% by weight, based on total weight of the electrodepositable coating composition. Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic solvents may typically be present in an amount of less than 10% by weight, such as less than 5% by weight, based on total weight of the electrodepositable coating composition. The electrodepositable coating composition may in particular be provided in the form of a dispersion, such as an aqueous dispersion.

For example, the organic solvent may comprise an ether or polyether comprising a hydroxyl group and a terminal group having the structure —O—R, wherein R is a $C_1$ to $C_4$ alkyl group, such as a $C_1$ to $C_3$ alkyl group, or two terminal hydroxyl groups. The polyether may comprise a homopolymer, block copolymer, or random copolymer. For example, the polyether may comprise a homopolymer of ethylene oxide or propylene oxide, or the polyether may comprise block or random copolymer comprising a combination of ethylene oxide and propylene oxide in a block or random pattern. Such organic solvents may comprise the structure:

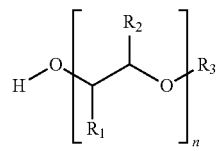

wherein $R_1$ and $R_2$ are each hydrogen or one of the $R_1$ and $R_2$ is hydrogen and the other is a methyl group; $R_3$ is H or a $C_1$ to $C_4$ alkyl group, such as a $C_1$ to $C_3$ alkyl group; and n is an integer from 1-50, such as from 1-40, such as from 1-30, such as from 1-20, such as from 1-12, such as from 1-8, such as from 1-6, such as from 1-4, such as from 2-50, such as from 2-40, such as from 2-30, such as from 2-20, such as from 2-12, such as from 2-8, such as from 2-6, such as from 2-4, such as from 3-50, such as from 3-40, such as from 3-30, such as from 3-20, such as from 3-12, such as from 3-8, such as from 3-6, such as from 3-4.

According to the present invention, the total solids content of the cationic electrodepositable coating composition may be at least 1% by weight, such as at least 5% by weight, and may be no more than 50% by weight, such as no more than 40% by weight, such as no more than 20% by weight, based on the total weight of the electrodepositable coating composition. The total solids content of the cationic electrodepositable coating composition may be from 1% to 50% by weight, such as 5% to 40% by weight, such as 5% to 20% by weight, based on the total weight of the electrodepositable coating composition. As used herein, "total solids" refers to the non-volatile content of the cationic electrodepositable coating composition, i.e., materials which will not volatilize when heated to 110° C. for 15 minutes.

The cationic electrodepositable coating composition may have a pH of 3.0 to 6.5, 3.0 to 6.0, such as such as 3.0 to 5.5, such as 3.0 to 5.0, such as 3.0 to 4.5, such as 3.0 to 4.0, such as 3.0 to 3.5, such as 3.5 to 6.5, such as 3.5 to 6.0, such as 3.5 to 5.5, such as 3.5 to 5.0, such as 3.5 to 4.5, such as 3.5 to 4.0, such as 4.0 to 6.5, such as 4.0 to 6.0, such as 4.0 to 5.5, such as 4.0 to 5.0, such as 4.0 to 4.5.

According to the present invention, the electrodepositable coating composition may optionally comprise a catalyst to catalyze the reaction of the binder components, such as, for example, between the curing agent and the film-forming polymer. Examples of catalysts suitable for cationic electrodepositable coating compositions include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate); or a cyclic guanidine as described in U.S. Pat. No. 7,842,762 at col. 1, line 53 to col. 4, line 18 and col. 16, line 62 to col. 19, line 8, the cited portions of which being incorporated herein by reference. During cure, the catalysts may be activated by external energy, such as thermal energy from heating.

According to the present invention, the cationic electrodepositable coating composition may comprise other optional ingredients, such as a non-phyllosilicate pigment, and, if desired, various additives such as fillers, plasticizers, antioxidants, biocides, UV light absorbers and stabilizers, hindered amine light stabilizers, defoamers, fungicides, dispersing aids, flow control agents, surfactants, wetting agents, or combinations thereof. Alternatively, the cationic electrodepositable coating composition may be completely free of any of the optional ingredients, i.e., the optional ingredient is not present in the cationic electrodepositable coating composition. The non-phyllosilicate pigment may comprise, for example, iron oxides, lead oxides, strontium chromate, carbon black, coal dust, titanium dioxide, barium sulfate, as well as color pigments such as cadmium yellow, cadmium red, chromium yellow and the like. The other additives mentioned above may be present in the cationic electrodepositable coating composition in amounts of 0.01% to 3% by weight, based on total weight of the resin solids of the electrodepositable coating composition.

According to the present invention, the cationic electrodepositable coating composition may be substantially free, essentially free, or completely free of tin. As used herein, a cationic electrodepositable coating composition is substantially free of tin if tin is present in an amount of less than 0.1% by weight, based on the total weight of the resin blend solids. As used herein, a cationic electrodepositable coating composition may be essentially free of tin if tin is present in an amount of less than 0.01% by weight, based on the total weight of the resin blend solids. As used here, a cationic electrodepositable coating composition is completely free of tin if tin is not present in the composition, i.e., 0.00% by weight, based on the total resin blend solids.

According to the present invention, the cationic electrodepositable coating composition may be substantially free, essentially free, or completely free of bismuth. As used herein, a cationic electrodepositable coating composition is substantially free of bismuth if bismuth is present in an amount of less than 0.1% by weight, based on the total weight of the resin blend solids. As used herein, a cationic electrodepositable coating composition may be essentially free of bismuth if bismuth is present in an amount of less than 0.01% by weight, based on the total weight of the resin blend solids. As used here, a cationic electrodepositable coating composition is completely free of bismuth if bismuth is not present in the composition, i.e., 0.00% by weight, based on the total resin blend solids.

According to the present invention, the cationic electrodepositable coating composition may be substantially free, essentially free, or completely free of metal pigment. As used herein, the term "metal pigment" refers to metal and metal alloy pigments that consist primarily of metal(s) in the elemental (zerovalent) state. The metal particles may include zinc, aluminum, cadmium, magnesium, beryllium, copper, silver, gold, iron, titanium, nickel, manganese, chromium, scandium, yttrium, zirconium, platinum, tin, and alloys thereof, as well as various grades of steel. As used herein, a cationic electrodepositable coating composition is substantially free of metal pigment if metal pigment is present in an amount of less than 5% by weight, based on the total weight of the pigment of the composition. As used herein, a cationic electrodepositable coating composition is essentially free of metal pigment if metal pigment is present in an amount of less than 1% by weight, based on the total weight of the pigment of the composition. As used here, a cationic electrodepositable coating composition is completely free of metal pigment if metal pigment is not present in the composition, i.e., 0.00% by weight, based on the total weight of the pigment of the composition.

According to the present invention, the cationic electrodepositable coating composition may be substantially free, essentially free, or completely free of silane dispersant. As used herein, a cationic electrodepositable coating composition is substantially free of silane dispersant if silane dispersant is present, if at all, in an amount of less than 1% by weight, based on the total solids weight of the composition. As used herein, a cationic electrodepositable coating composition is essentially free of silane dispersant if silane dispersant is present, if at all, in an amount of less than 0.1% by weight, based on the total solids weight of the composition. As used here, a cationic electrodepositable coating composition is completely free of silane dispersant if silane dispersant is not present in the composition, i.e., 0.00% by weight, based on the total solids weight of the composition.

Method of Making Cationic Electrodepositable Coating Composition

The present invention is also directed to a method of making an electrodepositable coating composition. The method comprises the steps of (1) heating an unneutralized cationic film-forming binder comprising a cationic salt forming group-containing, film-forming polymer to an elevated temperature; (2) adding the dispersing agent to the unneutralized cationic salt forming group-containing, film-forming polymer with agitation to form a mixture; (3) adding the phyllosilicate pigment to the mixture at elevated temperature with agitation; and (4) dispersing the mixture of the cationic salt forming group-containing, film-forming polymer, the phyllosilicate pigment, and dispersing agent into an aqueous medium comprising water and a resin neutralizing acid with agitation, wherein cationic salt forming groups in the cationic salt forming group-containing, film-forming polymer are neutralized by the resin neutralizing acid to form a cationic salt group-containing film forming polymer. The cationic binder may optionally further comprise a curing agent, and the curing agent may be added during or after any of steps 1 through 4. The phyllosilicate pigment and dispersing agent may form a phyllosilicate pigment-dispersing agent complex. The phyllosilicate pigment, dispersing agent, and cationic salt group-containing, film-forming polymer may also form a phyllosilicate pigment-dispersing agent-cationic salt group-containing, film-forming polymer complex.

The method of the present invention eliminates the need to prepare a separate pigment composition (such as, e.g., a pigment paste or a grinding vehicle) by allowing for incorporation of the pigment without the need for conventional grinding and/or a conventional grinding resin into a commercially viable electrocoat feed. Presently, electrodepositable coating compositions are commercially supplied as a two-component (2K) or one-component (1K) product. In the case of the 2K system, a separate resin blend and a separate pigment paste are sold to the customer. These materials are then combined with water in a specified ratio by the customer to product a stable electrocoat bath. One-component systems are also provided by electrocoat suppliers to some customers. However, these 1K systems are still produced from two separate components, but the components are combined into a single electrocoat feed by the electrocoat suppliers before shipment to customers. Accordingly, these 1K systems are still actually manufactured from two components. In contrast, the cationic electrodepositable coating composition of the present invention may be a true one-component electrodepositable coating composition that has been produced without the use a separately milled pigment paste. As used herein, a "one component electrodepositable coating composition" refers to a pigmented electrodepositable coating composition that is manufactured as a single component of dispersed binder and pigment without a separate pigment-containing composition.

According to the present invention, the electrodepositable coating composition optionally may be substantially free, essentially free, or completely free of a grind resin. As used herein, the term "grind resin" refers to a resin chemically distinct from the main film-forming polymer that is used during milling of pigment to form a pigment paste. As used herein, an electrodepositable coating composition is substantially free of grind resin if grind resin is present, if at all, in an amount of no more than 5% by weight, based on the total resin solids weight of the composition. As used herein, an electrodepositable coating composition is essentially free of grind resin if grind resin is present, if at all, in an amount no more than 3% by weight, based on the total resin solids weight of the composition. As used here, an electrodepositable coating composition is completely free of grind resin if grind resin is not present in the composition, i.e., 0.00% by weight, based on the total resin solids weight of the composition.

Without intending to be bound by any theory, it is believed that the interaction of the phyllosilicate pigment, dispersing agent, and resin, such as through a phyllosilicate pigment-dispersing agent complex or phyllosilicate pigment-dispersing agent-cationic salt group-containing, film-forming polymer complex, allows for the dispersion of the phyllosilicate pigment into the resin without the need for milling. Agglomeration often occurs by interaction of the negatively charged pigment face with positively charged pigment edges that results in a "house of cards" type stacking of pigment particles (i.e., a network of edge-to-face stacking of platey pigment particles). It is believed that the interaction of the dispersing agent and/or the cationic salt group-containing, film-forming polymer with the phyllosilicate pigment, such as through complexation, occurs at the edges of the pigment resulting in the positively charged edges (and overall particle) being made less positively and/or more negatively charged. The neutralization of the positively charged edges leads to less or no ionic attraction and may even result in ionic repulsion of the pigment particles thereby reducing the tendency of the pigments to agglomerate.

According to the present invention, the method of making an electrodepositable coating composition may further comprise a grinding and/or milling step following dispersing the mixture of the cationic salt forming group-containing, film-forming polymer, the phyllosilicate pigment, and dispersing agent into an aqueous medium comprising water and a resin neutralizing acid with agitation, wherein cationic salt forming groups in the cationic salt forming group-containing, film-forming polymer are neutralized by the resin neutralizing acid to form a cationic salt group-containing film forming polymer. The optional grinding and/or milling step may result in a more stable electrocoat bath.

The phyllosilicate pigment may also be incorporated into the electrodepositable coating composition of the present invention by standard methods used in the industry, such as preparing a pigment paste or grinding vehicle, with or without grinding.

Substrates

The cationic electrodepositable coating composition of the present invention may be applied onto a number of substrates. Accordingly, the present invention is further directed to a substrate that is coated, at least in part, with a coating deposited from the cationic electrodepositable coating composition described herein. It will be understood that the cationic electrodepositable coating composition can be applied onto a substrate as a monocoat or as a coating layer in a multi-layer coating composite. The cationic electrodepositable coating composition may be electrophoretically deposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise cold rolled steel, hot rolled steel, steel coated with zinc metal, zinc compounds, or zinc alloys, such as electrogalvanized steel, hot-dipped galvanized steel, galvanealed steel, and steel plated with zinc alloy. Aluminum alloys of the 2XXX, 5XXX, 6XXX, or 7XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. Suitable metal substrates for use in the present invention include those that are often used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, industrial structures and components such as appliances, including washers, dryers, refrigerators, stoves, dishwashers, and the like, agricultural equipment, lawn and garden equipment, air conditioning units, heat pump units, lawn furniture, and other articles. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091.

Methods of Coating, Coatings and Coated Substrates

The present invention is also directed to methods for coating a substrate, such as any one of the electroconductive substrates mentioned above. According the present invention, such methods may comprise electrodepositing a coating derived from the cationic electrodepositable coating composition as described above onto at least a portion of the substrate. The method may optionally further comprise subjecting the coating to curing conditions (e.g., heat) to form an at least partially cured coating on the substrate. According to the present invention, the method may comprise (a) electrodepositing onto at least a portion of the substrate a coating from the cationic electrodepositable coating composition of the present invention, and may optionally comprise (b) heating the coated substrate to a temperature and for a time sufficient to at least partially cure the electrodeposited coating on the substrate. According to the present invention, the method may optionally further comprise (c) applying directly to the at least partially cured electrodeposited coating one or more pigment-containing coating compositions and/or one or more pigment-free coating compositions to form a primer and/or top coat over at least a portion of the at least partially cured electrodeposited coating, and (d) heating the coated substrate of step (c) to a temperature and for a time sufficient to cure the primer and/or top coat. The primer and/or topcoat layers may also be applied to the electrodeposited coating layer prior to heating step (b), and each of the layers may be cured simultaneously by heating the coatings for a time sufficient to cure the coating layers according to heating step (d).

According to the present invention, the cationic electrodepositable coating composition of the present invention may be deposited upon an electrically conductive substrate by placing the composition in contact with an electrically conductive cathode and an electrically conductive anode, with the surface to be coated being the cathode. Following contact with the composition, an adherent film of the coating composition is deposited on the cathode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the cationic electrodepositable coating composition is electrodeposited over at least a portion of the electroconductive substrate, the coated substrate is heated to a temperature and for a time sufficient to at least partially cure the electrodeposited coating on the substrate. As used herein, the term "at least partially cured" with respect to a coating refers to a coating formed by subjecting the coating composition to curing conditions such that a chemical reaction of at least a portion of the reactive groups of the components of the coating composition occurs to form a coating. The coated substrate may be heated to a temperature ranging from 250° F. to 450° F. (121.1° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, the film thickness of the electrodeposited coating, level and type of catalyst present in the composition and the like. For purposes of the present invention, all that is necessary is that the time be sufficient to effect cure of the coating on the substrate. For example, the curing time can range from 10 minutes to 60 minutes, such as 20 to 40 minutes. The thickness of the resultant cured electrodeposited coating may range from 15 to 50 microns.

The electrodepositable coating compositions of the present invention may also, if desired, be applied to a substrate using non-electrophoretic coating application techniques, such as flow, dip, spray and roll coating applications. For non-electrophoretic coating applications, the coating compositions may be applied to conductive substrates as well as non-conductive substrates such as glass, wood and plastic.

The present invention is further directed to a coating formed by depositing a coating from the cationic electrodepositable coating composition described herein onto a substrate. The coating may be in a cured or at least partially cured state. Accordingly, the substrate may be coated with a coating layer comprising an at least partially cured cationic electrodepositable binder and a phyllosilicate pigment, and a dispersing agent. The phyllosilicate pigment may optionally be present as a phyllosilicate pigment-dispersing agent complex and/or a phyllosilicate pigment-dispersing agent-cationic salt group-containing, film-forming polymer complex. Either complex may optionally have an overall anionic charge.

The present invention is further directed to a substrate that is coated, at least in part, with a coating deposited from the cationic electrodepositable coating composition described herein. The coating on the substrate may be in a cured or at least partially cured state. The coating layer comprises an at least partially cured cationic electrodepositable binder and a phyllosilicate pigment, and a dispersing agent. The phyllosilicate pigment may optionally be present as a phyllosilicate pigment-dispersing agent complex and/or a phyllosilicate pigment-dispersing agent-cationic salt group-containing, film-forming polymer complex. Either complex may optionally have an overall anionic charge.

Multi-Layer Coating Composites

As described above, the cationic electrodepositable coating compositions of the present invention may be utilized in an electrocoating layer that is part of a multi-layer coating composite comprising a substrate with various coating layers. The coating layers may include a pretreatment layer, such as a phosphate layer (e.g., zinc phosphate layer or iron phosphate) or zirconium oxide layer, an electrocoating layer which results from the cationic electrodepositable coating composition of the present invention, optionally a primer layer, and suitable top coat layers (e.g., base coat, clear coat layer, pigmented monocoat, and color-plus-clear composite compositions). It is understood that suitable topcoat layers include any of those known in the art, and each independently may be waterborne, solventborne, in solid particulate form (i.e., a powder coating composition), or in the form of a powder slurry. The topcoat typically includes a film-forming polymer, crosslinking material and, if a colored base coat or monocoat, one or more pigments. According to the present invention, the primer layer is disposed between the electrocoating layer and the base coat layer. According to the present invention, one or more of the topcoat layers may be applied onto a substantially uncured underlying layer. For example, a clear coat layer may be applied onto at least a portion of a substantially uncured basecoat layer (wet-on-wet), and both layers may be simultaneously cured in a downstream process.

Moreover, the topcoat layers may be applied directly onto the electrodepositable coating layer. In other words, the substrate may lack a primer layer. For example, a basecoat layer may be applied directly onto at least a portion of the electrodepositable coating layer.

It will also be understood that the topcoat layers may be applied onto an underlying layer despite the fact that the underlying layer has not been fully cured. For example, a clearcoat layer may be applied onto a basecoat layer even though the basecoat layer has not been subjected to a curing step. Both layers may then be cured during a subsequent curing step thereby eliminating the need to cure the basecoat layer and the clearcoat layer separately.

According to the present invention, additional ingredients such as colorants and fillers may be present in the various coating compositions from which the topcoat layers result. Any suitable colorants and fillers may be used. For example, the colorant may be added to the coating in any suitable form, such as discrete particles, dispersions, solutions and/or flakes. A single colorant or a mixture of two or more colorants can be used in the coatings of the present invention. It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into the coatings by grinding or simple mixing. Colorants may be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

The colorant may be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions may also be produced by crystallization, precipitation, gas phase condensation, and chemical attrition (i.e., partial dissolution). In order to minimize re-agglomeration of nanoparticles within the coating, a dispersion of resin-coated nanoparticles may be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

According to the present invention, special effect compositions that may be used in one or more layers of the multi-layer coating composite include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions may provide other perceptible properties, such as reflectivity, opacity or texture. For example, special effect compositions may produce a color shift, such that the color of the coating changes when the coating is viewed at different angles. Example color effect compositions are identified in U.S. Pat. No. 6,894,086, incorporated herein by reference. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

According to the present invention, a photosensitive composition and/or photochromic composition, which reversibly alters its color when exposed to one or more light sources, can be used in a number of layers in the multi-layer composite. Photochromic and/or photosensitive compositions can be activated by exposure to radiation of a specified wavelength. When the composition becomes excited, the molecular structure is changed, and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition may be colorless in a non-excited state and exhibit a color in an excited state. Full color-change may appear within milliseconds to several minutes, such as from 20 seconds to 60 seconds. Example photochromic and/or photosensitive compositions include photochromic dyes.

According to the present invention, the photosensitive composition and/or photochromic composition may be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

As used herein, unless otherwise defined, the term "substantially free" means that the component is present, if at all, in an amount of less than 1% by weight, based on the total resin solids weight of the composition.

As used herein, unless otherwise defined, the term "essentially free" means that the component is present, if at all, in an amount of less than 0.1% by weight, based on the total resin solids weight of the composition.

As used herein, unless otherwise defined, the term "completely free" means that the component is not present in the composition, i.e., 0.00% by weight, based on the total resin solids weight of the composition.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" phyllosilicate pigment, "a" dispersing agent, "an" cationic salt group-containing film-forming polymer, and "a" curing agent, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

As used herein, the term "polymer" refers broadly to prepolymers, oligomers and both homopolymers and copolymers. It should be noted that the prefix "poly" refers to two or more.

As used herein, "adduct" means a product of a direct addition of two or more distinct molecules, resulting in a single reaction product containing all atoms of all components.

As used herein, the terms "resin solids" or "resin blend solids" include the cationic electrodepositable binder, and any additional water-dispersible non-pigmented component(s).

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Illustrating the invention are the following examples, which, however, are not to be considered as limiting the invention to their details. Unless otherwise indicated, all parts and percentages in the following examples, as well as throughout the specification, are by weight.

EXAMPLES

Resin Preparation

The following resin system (or electrodepositable binders) were prepared to be used in the examples more fully described below as indicated.

Resin System I: Resin System for Comparative Example

Preparation of Crosslinker I. A blocked polyisocyanate crosslinker, suitable for use in electrodepositable coating resins, was prepared in the following manner. Components 2-5 listed in Table 2, below, were mixed in a flask set up for total reflux with stirring under nitrogen. The mixture was heated to a temperature of 35° C., and Component 1 was added dropwise so that the temperature increased due to the reaction exotherm and was maintained under 100° C. After the addition of Component 1 was complete, a temperature of 110° C. was established in the reaction mixture and the reaction mixture held at temperature until no residual isocyanate was detected by IR spectroscopy. Component 6 was then added, and the reaction mixture was allowed to stir for 30 minutes at 100° C., and then was removed from the flask and allowed to cool to ambient temperature.

TABLE 2

Components for the preparation of Crosslinker 1

| No. | Component | Parts-by-weight (grams) |
|---|---|---|
| 1 | Polymeric methylene diphenyl diisocyanate [1] | 1340.00 |
| 2 | Dibutyltin dilaurate | 2.61 |
| 3 | Methyl isobutyl ketone | 200.00 |
| 4 | Diethylene glycol monobutyl ether | 324.46 |
| 5 | Ethylene glycol monobutyl ether | 945.44 |
| 6 | Methyl isobutyl ketone | 122.85 |

[1] Rubinate M, available from Huntsman Corporation.

Preparation of a Cationic, Amine-Functionalized, Polyepoxide-Based Resin (Resin System I). A cationic, amine-functionalized, polyepoxide-based polymeric resin, suitable for use in formulating electrodepositable coating compositions, was prepared in the following manner. Components 1-5 listed in Table 3, below, were combined in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 2 hours. Components 6-8 were then introduced into the reaction mixture and a temperature of 110° C. was established in the reaction mixture. Components 9 and 10 were then added to the reaction mixture quickly and the reaction mixture was allowed to exotherm. A temperature of 121° C. was established in the reaction mixture and the reaction mixture held for 1 hour. After the hold, the heating source was removed from the reaction mixture and Component 11 was introduced slowly. The contents of the flask were poured into a container and allowed to cool. The resulting Resin Synthesis Product I had a solids content of 65% by weight.

TABLE 3

Components for the preparation of Resin System 1

| No. | Component | Parts-by-weight (grams) |
|---|---|---|
| | Resin Synthesis Stage | |
| 1 | Bisphenol A diglycidyl ether [1] | 1659.63 |
| 2 | Bisphenol A | 716.64 |
| 3 | Bisphenol A-ethylene oxide adduct (1/6 molar ratio BPA/EtO) | 337.50 |
| 4 | Methyl isobutyl ketone (MIBK) | 83.93 |
| 5 | Ethyl triphenyl phosphonium iodide | 1.62 |
| 6 | Bisphenol A-ethylene oxide adduct (1/6 molar ratio BPA/EtO) | 337.50 |
| 7 | Methyl isobutyl ketone | 140.53 |
| 8 | Crosslinker I [2] | 1943.12 |
| 9 | Diethylene triamine-MIBK diketimine [3] | 153.92 |
| 10 | Methyl ethanol amine | 131.43 |
| 11 | 1-Methoxy-2-propanol | 2117.62 |

[1] EPON 828, available from Hexion Corporation.
[2] See synthesis of Crosslinker 1, above.
[3] 72.7% /o by weight (in MIBK) of the diketimine reaction product of 1 equivalent of diethylene triamile and 2 equivalents of MIBK.

Resin System II: Resins System for Examples 2 Through 23

Preparation of Crosslinker II. A blocked polyisocyanate crosslinker, suitable for use in electrodepositable coating resins, was prepared in the following manner. Components 2 and 3 listed in Table 4, below, were added to a flask set up for total reflux with stirring under nitrogen. The content of the flask was heated to a temperature of 35° C., and Component 1 was added dropwise so that the temperature increased due to the reaction exotherm and was maintained under 100° C. After the addition of Component 1 was complete, a temperature of 100° C. was established in the reaction mixture and the reaction mixture held at temperature until no residual isocyanate was detected by IR spectroscopy. Components 4 and 5 were then added and the reaction mixture was allowed to stir for 30 minutes at 100° C., and then was removed from the flask and allowed to cool to ambient temperature.

TABLE 4

Components for the preparation of Crosslinker II

| No. | Component | Parts-by-weight (grams) |
|---|---|---|
| 1 | Polymeric methylene diphenyl diisocyanate [1] | 1422.05 |
| 2 | K Kat XK 620 (Zn amidine)[2] | 3.49 |
| 3 | Diethylene glycol monobutyl ether | 1721.64 |
| 4 | Butyl carbitol formal | 12.73 |
| 5 | Bisphenol A-ethylene oxide adduct (1/6 molar ratio BPA/EtO) | 140.08 |

[1] Rubinate M, available from Huntsman Corporation.
[2] Available from King Industries Preparation of a Cationic, Amine-Functionalized, Polyepoxide-Based Resin (Resin System II). A cationic, amine-functionalized, polyepoxide-based polymeric resin, suitable for use in formulating electrodepositable coating compositions, was prepared in the following manner. Components 1–4 listed in Table 5, below, were combined in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 1 hour. Component 5 was then introduced into the flask, followed by Components 6-7, and a temperature of 100° C. was established in the reaction mixture. Premixed components 8 and 9 were then added to the reaction mixture quickly and the reaction mixture was allowed to exotherm. A temperature of 110° C. was established in and the reaction mixture was held for 1 hour. After the hold, the content of the flask was poured out and cooled to room temperature.

TABLE 5

Components for the preparation of Resin System II

| No. | Component | Parts-by-weight (grams) |
|---|---|---|
| | Resin Synthesis Stage | |
| 1 | Bisphenol A diglycidyl ether[1] | 1413.76 |
| 2 | Bisphenol A | 610.01 |
| 3 | Bisphenol A-ethylene oxide adduct (1/6 molar ratio BPA/EtO) | 230.00 |
| 4 | Ethyl triphenyl phosphonium bromide | 1.38 |
| 5 | Bisphenol A-ethylene oxide adduct (1/6 molar ratio BPA/EtO) | 316.26 |
| 6 | Crosslinker II[2] | 2843.92 |
| 7 | Butyl carbitol formal | 515.20 |
| 8 | N-(3-Aminopropyl)diethanolamine[3] | 50.07 |
| 9 | Methyl ethanol amine | 108.34 |

[1] EPON 828, available from Hexion Corporation.
[2] See synthesis of Crosslinker II above.
[3] Avaiable from Huntsman or Air Products.

Resin System III: Resin System for Example 24

Preparation of Crosslinker III. A blocked polyisocyanate crosslinker, suitable for use in electrodepositable coating resins, was prepared in the following manner. Components 2 and 3 listed in Table 6, below, were added to a flask set up for total reflux with stirring under nitrogen. The content of the flask was heated to a temperature of 35° C., and Component 1 was added dropwise so that the temperature increased due to the reaction exotherm and was maintained under 100° C. After the addition of Component 1 was complete, a temperature of 100° C. was established in the reaction mixture and the reaction mixture held at temperature until no residual isocyanate was detected by IR spectroscopy. Components 4 and 5 were then added and the reaction mixture was allowed to stir for 30 minutes at 100° C., and then was removed from the flask and allowed to cool to ambient temperature.

TABLE 6

Components for the preparation of Crosslinker III

| No. | Component | Parts-by-weight (grams) |
|---|---|---|
| 1 | Polymeric methylene diphenyl diisocyanate [1] | 402.00 |
| 2 | K Kat XK 620 (Zn amidine) | 0.99 |
| 3 | Triethylene glycol monomethyl ether [2] | 492.60 |
| 4 | Butyl carbitol formal | 3.60 |
| 5 | Bisphenol A-ethylene oxide adduct (1/6 molar ratio BPA/EtO) | 39.60 |

[1] Rubinate M, available from Huntsman Corporation.
[2] Available from Aldrich.

Preparation of a Cationic, Amine-Functionalized, Polyepoxide-Based Resin (Resin System III). A cationic, amine-functionalized, polyepoxide-based polymeric resin, suitable for use in formulating electrodepositable coating compositions, was prepared in the following manner. Components 1-4 listed in Table 7, below, were combined in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 1 hour. Component 5 was then introduced into the flask, followed by Components 6-7, and a temperature of 100° C. was established in the reaction mixture. Premixed components 8 and 9 were then added to the reaction mixture quickly and the reaction mixture was allowed to exotherm. A temperature of 110° C. was established in and the reaction mixture was held for 1 hour. After the hold, the content of the flask was poured out and cooled to room temperature.

TABLE 7

Components for the preparation of Resin System III

| No. | Component | Parts-by-weight (grams) |
|---|---|---|
| | Resin Synthesis Stage | |
| 1 | Bisphenol A diglycidyl ether[1] | 350.37 |
| 2 | Bisphenol A | 151.18 |
| 3 | Bisphenol A-ethylene oxide adduct (1/6 molar ratio BPA/EtO) | 57.00 |
| 4 | Ethyl triphenyl phosphonium bromide | 0.34 |
| 5 | Bisphenol A-ethylene oxide adduct (1/6 molar ratio BPA/EtO) | 78.37 |
| 6 | Crosslinker III[2] | 709.34 |
| 7 | Butyl carbitol formal | 63.84 |
| 8 | N-(3-Aminopropyl)diethanolamine[3] | 12.41 |
| 9 | Methyl ethanol amine | 26.85 |

[1]EPON 828, available from Hexion Corporation.
[2]See synthesis of Crosslinker III, above.
[3]Available from Huntsman or Air Products.

Resin System IV: Resin System for Example 25

Preparation of Crosslinker IV. A blocked polyisocyanate crosslinker, suitable for use in electrodepositable coating resins, was prepared in the following manner. Components 2 and 3 listed in Table 8, below, were added to a flask set up for total reflux with stirring under nitrogen. The content of the flask was heated to a temperature of 35° C., and Component 1 was added dropwise so that the temperature increased due to the reaction exotherm and was maintained under 100° C. After the addition of Component 1 was complete, a temperature of 100° C. was established in the reaction mixture and the reaction mixture held at temperature until no residual isocyanate was detected by IR spectroscopy. Components 4 and 5 were then added and the reaction mixture was allowed to stir for 30 minutes at 100° C., and then was removed from the flask and allowed to cool to ambient temperature.

TABLE 8

Components for the preparation of Crosslinker IV

| No. | Component | Parts-by-weight (grams) |
|---|---|---|
| 1 | Polymeric methylene diphenyl diisocyanate[1] | 402.00 |
| 2 | K Kat XK 620 (Zn amidine) | 1.04 |
| 3 | Triethylene glycol monoethyl ether[2] | 534.69 |
| 4 | Butyl carbitol formal | 3.60 |

TABLE 8-continued

Components for the preparation of Crosslinker IV

| No. | Component | Parts-by-weight (grams) |
|---|---|---|
| 5 | Bisphenol A-ethylene oxide adduct (1/6 molar ratio BPA/EtO) | 39.60 |

[1]Rubinate M, available from Huntsman Corporation.
[2]Available from Aldrich.

Preparation of a Cationic, Amine-Functionalized, Polyepoxide-Based Resin (Resin System IV). A cationic, amine-functionalized, polyepoxide-based polymeric resin, suitable for use in formulating electrodepositable coating compositions, was prepared in the following manner. Components 1-4 listed in Table 9, below, were combined in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 1 hour. Component 5 was then introduced into the flask, followed by Components 6-7, and a temperature of 100° C. was established in the reaction mixture. Premixed components 8 and 9 were then added to the reaction mixture quickly and the reaction mixture was allowed to exotherm. A temperature of 110° C. was established in and the reaction mixture was held for 1 hour. After the hold, the content of the flask was poured out and cooled to room temperature.

TABLE 9

Components for the preparation of Resin System IV

| No. | Component | Parts-by-weight (grams) |
|---|---|---|
| | Resin Synthesis Stage | |
| 1 | Bisphenol A diglycidyl ether[1] | 350.37 |
| 2 | Bisphenol A | 151.18 |
| 3 | Bisphenol A-ethylene oxide adduct (1/6 molar ratio BPA/EtO) | 57.00 |
| 4 | Ethyl triphenyl phosphonium bromide | 0.34 |
| 5 | Bisphenol A-ethylene oxide adduct (1/6 molar ratio BPA/EtO) | 78.37 |
| 6 | Crosslinker IV[2] | 709.34 |
| 7 | Butyl carbitol formal | 63.84 |
| 8 | N-(3-Aminopropyl)diethanolamine[3] | 12.41 |
| 9 | Methyl ethanol amine | 26.85 |

[1]EPON 828, available from Hexion Corporation.
[2]See synthesis of Crosslinker IV, above.
[3]Avaiable from Huntsman or Air Products.

Resin System V: Resin System for Example 26

Preparation of Crosslinker V. A blocked polyisocyanate crosslinker, suitable for use in electrodepositable coating resins, was prepared in the following manner. Components 2 and 3 listed in Table 10, below, were added to a flask set up for total reflux with stirring under nitrogen. The content of the flask was heated to a temperature of 35° C., and Component 1 was added dropwise so that the temperature increased due to the reaction exotherm and was maintained under 100° C. After the addition of Component 1 was complete, a temperature of 100° C. was established in the reaction mixture and the reaction mixture held at temperature until no residual isocyanate was detected by IR spectroscopy. Components 4 and 5 were then added and the reaction mixture was allowed to stir for 30 minutes at 100° C., and then was removed from the flask and allowed to cool to ambient temperature.

TABLE 10

Components for the preparation of Crosslinker V

| No. | Component | Parts-by-weight (grams) |
|---|---|---|
| 1 | Polymeric methylene diphenyl diisocyanate [1] | 361.80 |
| 2 | K Kat XK 620 (Zn amidine) | 1.02 |
| 3 | Triethylene glycol monobutyl ether [2] | 556.96 |
| 4 | Butyl carbitol formal | 3.24 |
| 5 | Bisphenol A-ethylene oxide adduct (1/6 molar ratio BPA/EtO) | 35.64 |

[1] Rubinate M, available from Huntsman Corporation.
[2] Available from Aldrich.

Preparation of a Cationic, Amine-Functionalized, Polyepoxide-Based Resin (Resin System V). A cationic, amine-functionalized, polyepoxide-based polymeric resin, suitable for use in formulating electrodepositable coating compositions, was prepared in the following manner. Components 1-4 listed in Table 11, below, were combined in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 1 hour. Component 5 was then introduced into the flask, followed by Components 6-7, and a temperature of 100° C. was established in the reaction mixture. Premixed components 8 and 9 were then added to the reaction mixture quickly and the reaction mixture was allowed to exotherm. A temperature of 110° C. was established in and the reaction mixture was held for 1 hour. After the hold, the content of the flask was poured out and cooled to room temperature.

TABLE 11

Components for the preparation of Resin System V

| No. | Component | Parts-by-weight (grams) |
|---|---|---|
| | Resin Synthesis Stage | |
| 1 | Bisphenol A diglycidyl ether[1] | 325.78 |
| 2 | Bisphenol A | 140.57 |
| 3 | Bisphenol A-ethylene oxide adduct (1/6 molar ratio BPA/EtO) | 53.00 |
| 4 | Ethyl triphenyl phosphonium bromide | 0.32 |
| 5 | Bisphenol A-ethylene oxide adduct (1/6 molar ratio BPA/EtO) | 72.86 |
| 6 | Crosslinker V[2] | 748.36 |
| 7 | Butyl carbitol formal | 59.36 |
| 8 | N-(3-Aminopropyl)diethanolamine [3] | 11.54 |
| 9 | Methyl ethanol amine | 24.97 |

[1]EPON 828, available from Hexion Corporation.
[2]See synthesis of Crosslinker V, above.
[3] Available from Huntsman or Air Products.

Resin System VI: Resin System for Example 27

Preparation of Crosslinker VI. A blocked polyisocyanate crosslinker (Crosslinker V), suitable for use in electrodepositable coating resins, was prepared in the following manner. Components 2 and 3 listed in Table 12, below, were added to a flask set up for total reflux with stirring under nitrogen. The content of the flask was heated to a temperature of 35° C., and Component 1 was added dropwise so that the temperature increased due to the reaction exotherm and was maintained under 100° C. After the addition of Component 1 was complete, a temperature of 100° C. was established in the reaction mixture and the reaction mixture was held at temperature until no residual isocyanate was detected by IR spectroscopy. Components 4 and 5 were then added and the reaction mixture was allowed to stir for 30 minutes at 100° C., and then was removed from the flask and allowed to cool to ambient temperature.

TABLE 12

Components for the preparation of Crosslinker VI.

| No. | Component | Parts-by-weight (grams) |
|---|---|---|
| 1 | Polymeric methylene diphenyl diisocyanate [1] | 402.00 |
| 2 | K Kat XK 620 (Zn amidine) | 1.03 |
| 3 | Eastman EEH (Ethylene glycol 2-ethylhexyl ether) | 522.84 |
| 4 | Butyl carbitol formal | 3.60 |
| 5 | Bisphenol A-ethylene oxide adduct (1/6 molar ratio BPA/EtO) | 39.60 |

[1] Rubinate M, available from Huntsman Corporation.
[2] Eastman EEH is available from Eastman Chemical Company.

Preparation of a Cationic, Amine-Functionalized, Polyepoxide-Based Resin (Resin System VI). A cationic, amine-functionalized, polyepoxide-based polymeric resin, suitable for use in formulating electrodepositable coating compositions, was prepared in the following manner. Components 1-4 listed in Table 13, below, were combined in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 1 hour. Component 5 was then introduced into the flask, followed by Components 6-7, and a temperature of 100° C. was established in the reaction mixture. Premixed components 8 and 9 were then added to the reaction mixture quickly and the reaction mixture was allowed to exotherm. A temperature of 110° C. was established in and the reaction mixture was held for 1 hour. After the hold, the content of the flask was poured out and cooled to room temperature.

TABLE 13

Components for the preparation of Resin System VI

| No. | Component | Parts-by-weight (grams) |
|---|---|---|
| | Resin Synthesis Stage | |
| 1 | Bisphenol A diglycidyl ether[1] | 338.07 |
| 2 | Bisphenol A | 145.87 |
| 3 | Bisphenol A-ethylene oxide adduct (1/6 molar ratio BPA/EtO) | 55.00 |
| 4 | Ethyl triphenyl phosphonium bromide | 0.33 |
| 5 | Bisphenol A-ethylene oxide adduct (1/6 molar ratio BPA/EtO) | 75.60 |
| 6 | Crosslinker VI[2] | 706.53 |
| 7 | Butyl carbitol formal | 61.60 |
| 8 | N-(3-Aminopropyl)diethanolamine[3] | 11.97 |
| 9 | Methyl ethanol amine | 25.91 |

[1]EPON 828, available from Hexion Corporation.
[2]See Example Crosslinker VI above.
[3]Available from Huntsman or Air Products.

Resin System VII: Resin System for Examples 28 and 29

Preparation of Crosslinker VII. A blocked polyisocyanate crosslinker, suitable for use in electrodepositable coating resins, was prepared in the following manner. Components 2-5 listed in Table 14, below, were mixed in a flask set up for total reflux with stirring under nitrogen. The mixture was heated to a temperature of 35° C., and Component 1 was added dropwise so that the temperature increased due to the reaction exotherm and was maintained under 100° C. After the addition of Component 1 was complete, a temperature of 110° C. was established in the reaction mixture and the reaction mixture held at temperature until no residual isocyanate was detected by IR spectroscopy. Component 6 was then added and the reaction mixture was allowed to stir for 30 minutes at 100° C., and then was removed from the flask and allowed to cool to ambient temperature.

TABLE 14

Components for the preparation of Crosslinker VII

| No. | Component | Parts-by-weight (grams) |
|---|---|---|
| 1 | Polymeric methylene diphenyl diisocyanate | 1340.00 |
| 2 | K Kat XK 620 (Zn amidine) | 2.77 |
| 3 | Triethylene glycol monomethyl ether | 1149.40 |
| 4 | Polyethylene glycol 400[1] | 600.00 |
| 5 | Butyl Carbitol Formal | 12.00 |
| 6 | Bisphenol A-ethylene oxide adduct (1/6 molar ratio BPA/EtO) | 132.00 |

[1]Polyethylene glycol 400 available from Aldrich.

Preparation of a Cationic, Amine-Functionalized, Polyepoxide-Based Resin (Resin System X). A cationic, amine-functionalized, polyepoxide-based polymeric resin, suitable for use in formulating electrodepositable coating compositions, was prepared in the following manner. Components 1-4 listed in Table 15, below, were combined in a flask set up for total reflux with stirring under nitrogen. The mixture was heated to a temperature of 130° C. and allowed to exotherm (175° C. maximum). A temperature of 145° C. was established in the reaction mixture and the reaction mixture was then held for 2 hours. Components 5-6 were then introduced into the reaction mixture and a temperature of 110° C. was established in the reaction mixture. Components 7-9 were then added to the reaction mixture quickly and the reaction mixture was allowed to exotherm. A temperature of 121° C. was established in the reaction mixture and the reaction mixture held for 1 hour. After the hold, the heating source was removed from the reaction mixture and the contents of the flask were poured into a container and allowed to cool.

TABLE 15

Components for the preparation of Resin System VII

| No. | Component | Parts-by-weight (grams) |
|---|---|---|
| | Resin Synthesis Stage | |
| 1 | Bisphenol A diglycidyl ether | 2335.78 |
| 2 | Bisphenol A | 1007.84 |
| 3 | Bisphenol A-ethylene oxide adduct (1/6 molar ratio BPA/EtO) | 380 |
| 4 | Ethyl triphenyl phosphonium bromide | 2.28 |
| 5 | Bisphenol A-ethylene oxide adduct (1/6 molar ratio BPA/EtO) | 598.71 |
| 6 | Crosslinker VII[1] | 3022.4 |
| 7 | N-(3-Aminopropyl)diethanolamine | 82.73 |
| 8 | Methyl ethanol amine | 179 |
| 9 | Butyl Carbitol Formal | 425.6 |

[1]See synthesis of Crosslinker VII, above

Electrodepositable Coating Composition Examples

Sources of Formulation Additives and Chemicals: Chemicals used for formulation of electrocoat baths were obtained from various suppliers. MAZON 1651 (butyl carbitol diformal or diethylene glycol monobutyl ether formaldehyde adduct), a plasticizer, is commercially available from BASF Corporation (98% purity). Ethylene glycol monobutyl ether (butyl cellosolve) is commercially available from MIL-LIPORESIGMA/SIGMA-ALDRICH CORPORATION. The following solvents were obtained from the Dow Chemical Company at 98% purity: Dowanol PM, butyl carbitol, and Dowanol PNB Glycol Ether (Propasol B). Triethylene glycol monomethyl ether (TGME), triethylene glycol monoethyl ether (TGEE) and Triethylene glycol monobutyl ether (TGBE) were all obtained from Sigma-Aldrich Corporation at 98% purity. Phosphoric acid (85 wt. % active in water) was obtained from PPG Industries, trisodium phosphate dodecahydrate was obtained from Acros Organics (98+% purity), and monosodium phosphate dihydrate was obtained from Alfa Aesar (98+% purity). Sulfamic acid was obtained from PPG industries. Citric acid, glacial acetic acid (99.7% pure), and oxalic acid (technical grade, 90% purity) were all obtained from Fisher Scientific.

Evaluation of Bath Stability of Highly Pigmented Electrocoats

Highly Pigmented Comparative Example 1: Clay (390.0 g, ASP 200 available from BASF) was added to Resin I (800.0 g) and mixed under high sheer (2500 RPM using a 1.5-inch Cowles blade) for 10 minutes starting at 25° C. in a metal beaker. The temperature of the vessel was not controlled during this process. To the resin/clay mixture was added E6278I (21.4 g, dibutyltin dioxide paste available from PPG), Dynasylan 4148 (7.8 g, available from Evonik Industries) and diethylene glycol monobutyl ether-formaldehyde adduct (10.4 g). High sheer mixing continued for an additional 50 minutes. A portion of this clay/resin paste (80%, 983.0 g) was added to a solution of sulfamic acid (12.5 g) dissolved deionized water (413.8 g). This material was mixed for twenty more minutes. The resultant 1K high solids feed had a P:B of 0.75:1 and had 54 wt. % bath solids. This material was diluted with deionized water for a total weight of 3800 g and final bath solids of 20%. The final bath had a pH of 5.01 and a conductivity of 868 µS/cm. For each of the examples, the pH and conductivity were measured through the use of a Thermo Scientific Orion Star A215 benchtop pH/conductivity meter with an Orion 013005MD conductivity cell and Orion 8157BNUMD Ross Ultra pH/ATC Triode, all commercially available from Thermo Fisher Scientific, Inc.

Control A: This electrocoat is commercially available as a 1K feed from PPG under the name Powercron 590-534 (product code: CF590-534). Deionized water (2312.6 g) was added to 1487.4 g of CF590-534 under agitation for one hour. This material was then used to electrocoat panels. The P:B of this paint was 0.15:1.0. Control A was used according to the technical bulletin.

Evaluation of Bath Stability: CRS panels pretreated with zinc phosphate (C700/DI; item: 28630 available from ACT, Hillsdale, MI) were cut in half to yield a 4" by 6" panel. Then, 0.25 inches was removed from each side of the panel resulting in a panel that was 3.5" by 6", which was bent into an "L" shape yielding a 4-in vertical surface and 2-inch horizontal surface. This panel was submerged in the electrocoat and agitation was stopped. After three minutes of sitting in the unagitated bath, electrodeposition began. A rectifier (Xantrax Model XFR600-2, Elkhart, Indiana, or Sorensen XG 300-5.6, Ameteck, Berwyn, Pennsylvania) which was DC-power supplied was used to apply the electrodepositable coating. The target film build was 0.5 to 0.7 mils (12.7 to 17.8 microns) on the vertical face. This film thickness was deposited by using the voltage/temperature/current conditions for a DFT of 25.4 microns (two-minute condition), but for one minute. Exact coating conditions for each paint are found in the Table 16. After panels were electrocoated, these panels were rinsed with deionized water and baked at 350° F. for 30 minutes in an electric oven (Despatch Model LFD-1-42). The roughness of the horizontal and vertical surfaces were measured using a Precision Surtronic 25 Profilometer available from Taylor Hobson. The instrument was referenced using 3-inch silicon wafer available from Ted Pella Inc. (Product Number 16013), which had a roughness of 1.0±0.7 microinches after 10 repeat measurements.

TABLE 16

Comparison of electrodeposition conditions and cured film roughness

| Example | Voltage (V) | Current (amps) | Time (minutes) | Bath Temperature (° F.) | Vertical Surface Roughness (microinches) | Horizontal Surface Roughness (microinches) |
|---|---|---|---|---|---|---|
| Comparative Example 1 | 250 V | 0.5 amps | 1.0 | 90 | 10 | 200+ |
| Control A | 150 V | 0.5 amps | 1.0 | 90 | 10 | 30 |

Since electrodepositable coating compositions are often applied to parts with complex shapes having both horizontal and vertical surfaces, it is desirable to have comparable roughness irrespective of the orientation of the surface to be coated. The large difference between the vertical and horizontal surface roughness of the highly pigmented Comparative Example 1 using silane as a dispersing agent indicates that the bath lacks stability and does not provide performance that approaches a standard electrodepositable coating composition as demonstrated in Control A.

Examples for Corrosion Testing with Resin II

Resin System II was prepared to avoid the need for ketamine in the resin. The presence of excess MIBK in the final electrocoat formula will also increase the measured volatile organic content (VOC). Resin II was designed to be a high solids material with minimal VOC.

9100HE (Control B): This material is commercially available from PPG Industries as a 1K feed under the product name Powercron 686-470. This paint was applied according to the process control and product data sheet issued by PPG. This electrocoat has a PB of 0.1:1.0.

Comparative Examples 2 to 7: Examples 2 through 7 were prepared according to the following general procedure. A stainless-steel beaker (1200-mL) was loaded with 450 grams of resin II which had been warmed to 85° C. using a thermocouple (J-KEM Scientific Model 410A) and a heating mantle. A 1.5-inch Cowles blade was used to agitate the resin at 2500 RPM powered by a Fawcett air motor (Model 103A). The following ingredients were added in the order listed. Specific amounts not denoted in the text are listed in table 17. To the resin was added, butyl cellosolve (72.0 g) which was allowed to incorporate for five minutes. Next, clay (available from BASF as ASP 200 or ASP 900) was added over five minutes followed by Dynasylan 4148 (1.7 g) available from Evonik, and deionized water (17.0 g). This mixture was agitated for one hour after which the degree of dispersion was determined by a Hegman gauge. To be adequately dispersed, a minimal reading of 5 had to be achieved.

TABLE 17

Electrocoat Bath P:B and amount of clay added for examples 2 through 7.

| Example | Bath P:B Ratio | Clay | Mass of Clay (g) |
|---|---|---|---|
| Comp. 2 | 0.75:1 | ASP 900 | 337.5 |
| Comp. 3 | 0.4:1.0 | ASP 900 | 180.0 |
| Comp. 4 | 0.2:1.0 | ASP 900 | 90.0 |
| Comp. 5 | 0.1:1.0 | ASP 900 | 45.0 |

TABLE 17-continued

Electrocoat Bath P:B and amount of clay added for examples 2 through 7.

| Example | Bath P:B Ratio | Clay | Mass of Clay (g) |
|---|---|---|---|
| Comp. 6 | 0.75:1.0 | ASP 200 | 337.5 |
| Comp. 7 | 0.2:1.0 | ASP 200 | 90.0 |

For the dispersion step, the clay/resin II paste was added to a mixture of acid and water. For examples 2 through 7, 80% (of the weight) of the clay/resin II dispersion was added to another stainless-steel beaker which contained deionized water and sulfamic acid (4.7 g) kept at 25° C. to yield a 1K feed at high solids. The mass representing 80% of the weight, the amount of water, and the drop solids are reported in table 18.

TABLE 18

Masses of Materials used to make high solids 1K formula for examples 2 through 7.

| Example | Bath P:B Ratio | Clay | Drop Solids for 1K Feed (Wt. %) | Mass of Resin/ Clay Paste Added for Neutralization (g) | Mass of Water Added to Make High Solids 1K Feed (g) |
|---|---|---|---|---|---|
| Comp. 2 | 0.75:1 | ASP 900 | 65% | 702.5 | 360.0 |
| Comp. 3 | 0.4:1.0 | ASP 900 | 65% | 576.5 | 292.2 |
| Comp. 4 | 0.2:1.0 | ASP 900 | 60% | 504.5 | 316.9 |
| Comp. 5 | 0.1:1.0 | ASP 900 | 60% | 468.5 | 292.4 |
| Comp. 6 | 0.75:1.0 | ASP 200 | 65% | 702.5 | 360.0 |
| Comp. 7 | 0.2:1.0 | ASP 200 | 65% | 504.5 | 253.4 |

Electrocoat bath at 20% solids were prepared for examples 2 through 7 by the addition of deionized water to the high solids 1K feed by sufficient deionized water to make a total bath weight of 3800 g. Half of the water reported in Table 18 was added, then the tin paste, and finally the remainder of the water. The tin-catalyst was added via E6278I (a dibutyl tin oxide [DBTO] paste available from PPG Industries which is 7.2 wt. % DBTO) to provide a Sn loading of 0.7 weight % on resin solids.

Control B and comparative examples 2 through 7 were used to electrocoat zinc phosphated CRS. Panels were cut in half to a size of 4" by 6". A rectifier (Xantrax Model XFR600-2, Elkhart, Indiana, or Sorensen XG 300-5.6, Ameteck, Berwyn, Pennsylvania) which was DC-power supplied was used to apply the electrodepositable coating at 90° F. After panels were electrocoated, these panels were rinsed with deionized water and baked at 350° F. for 30 minutes in an electric oven (Despatch Model LFD-1-42). The target dry film thickness was 25.4 microns (1 mil). The exact deposition conditions can be found in table 19 for each run. Three panels coated with each electrocoat composition were scribed with a 3-inch vertical line in the middle of the panel down to the metal substrate. Panels were then placed in GMW14872 testing for a total of 40 cycles (days). After testing, panels were rinsed with deionized water, and allowed to air dry. The amount of corrosion in the scribed area was then measured and is reported in Table 19. Scribe creep refers to the area of paint loss around the scribe either through corrosion or disbondment (e.g.: affected paint to affected paint).

TABLE 19

Electrodeposition conditions for control B and examples 2 through 7 and corrosion results

| Example | Voltage (V) | Current (amps) | Time (minutes) | Scribe Creep (mm) |
| --- | --- | --- | --- | --- |
| Control B | 200 V | 0.5 amps | 1.5 minutes | 6.2 |
| Comp. 2 | 115 V | 0.5 amps | 1.5 minutes | 4.5 |
| Comp. 3 | 75 V | 0.5 amps | 1.5 minutes | 3.2 |
| Comp. 4 | 50 V | 0.5 amps | 1.5 minutes | 5.5 |
| Comp. 5 | 50 V | 0.5 amps | 1.5 minutes | 6.1 |
| Comp. 6 | 265 V | 0.5 amps | 1.5 minutes | 3.5 |
| Comp. 7 | 50 V | 0.5 amps | 1.5 minutes | 5.6 |

As demonstrated above, the modified resin and higher pigmentation loading using the silane dispersant of comparative examples 2-7 resulted in coatings that maintained or improved corrosion performance in comparison to the Control B composition. Further investigation of the stability of these compositions was conducted.

Pump Stability of Reformulated Paints

Comparative Example 8: A stainless-steel beaker (2-liter) was loaded with 680 grams of resin II which had been warmed to 85° C. using a thermocouple and heating mantle. A 1.5-inch Cowles blade was used to agitate the resin at 2500 RPM powered by a Fawcett air motor (Model 103A). The following ingredients were added in the order listed. To the resin was added, 98.9 g of Dowanol PM which was allowed to incorporate for five minutes. Next, 340.0 g ASP 200 was added over five minutes followed by Dynasylan 4148 (5.1 g), and deionized water (51.0 g). This mixture was agitated for one hour after which the degree of dispersion was determined by a Hegman gauge. To be adequately dispersed, a minimal reading of 5 had to be achieved. For the dispersion step, the clay/resin II paste was added to a mixture of acid and water. For Example 8, a portion of the clay/resin dispersion (822.5 g) was added to another stainless-steel beaker which contained deionized water (613.2 g) and sulfamic acid (6.2 g) kept at 60° C. yielding a 1K feed at 55 wt. % solids. The electrocoat bath at 20 wt. % solids was prepared by the addition of deionized water to the high solids 1K feed to make a total bath weight of 3800 g. Dilution of the 1K feed material with DI water and addition of tin paste was identical to the manner described in Examples 2 through 7. The final bath pH was 4.87 and the conductivity was 277 µS/cm.

Comparative Example 9: A stainless-steel beaker (2-liter) was loaded with 580 grams of resin II which had been warmed to 85° C. using a thermocouple and heating mantle. A 1.5-inch Cowles blade was used to agitate the resin at 2500 RPM powered by a Fawcett air motor (Model 103A). The following ingredients were added in the order listed. To the resin was added, 84.4 g of Dowanol PM which was allowed to incorporate for five minutes. Next, 435.0 g ASP 200 was added over five minutes followed by Dynasylan 4148 (6.5 g), and deionized water (65.3 g). This mixture was agitated for one hour after which the degree of dispersion was determined by a Hegman gauge. To be adequately dispersed, a minimal reading of 5 had to be achieved. For the dispersion step, the clay/resin II paste was added to a mixture of acid and water. For Example 9, a portion of the clay/resin dispersion (819.8 g) was added to another stainless-steel beaker which contained deionized water (592.1 g) and sulfamic acid (5.3 g) kept at 60° C. yield a 1K feed at 55 wt. % solids. The electrocoat bath at 20 wt. % solids was prepared by the addition of deionized water to the high solids 1K feed to make a total bath weight of 3800 g. Dilution of the 1K feed materials with DI water and addition of tin paste was identical to the manner described in Examples 2 through 7. The final bath pH was 5.17 and the conductivity was 285 µS/cm.

Evaluation of Bath Stability: For comparative examples 8 and 9, L-panels were coated in a manner identical to those coated in comparative example 1. To coat L-panels, the electrodeposition conditions for Example 8 were 200 V/90° F./60 seconds/0.5 amps and for Example 9 were 250 V/90° F./60 seconds/0.5 amps. The roughness of the horizontal and vertical surfaces were measured using a Precision Surtronic 25 Profilometer available from Taylor Hobson and are reported in table 20.

Control A (3800 g bath) and Example 10 (3800 g bath) were pumped for 16 hours using a Little Giant 4-MD magnetic drive pump (SKU 582002, 1/12 HP, 115V) at 95° F. After pumping these materials were passed through a 335-mesh sieve. Then, L-panels were coated with the pumped materials. To pass the pump test, less than 1 g of material must be collected on the 335-mesh sieve and the appearance of the pre and post pumped paint must be similar. Table 20 summarizes the results of pump stability testing.

TABLE 20

Impact of resin II and silane dispersant on bath stability

| Example | Bath P:B Ratio | Vertical Surface Roughness (microinches) | Horizontal Surface Roughness (microinches) | Was Material Pumped? | Passed 335 Mesh Sieve? (less than 1.0 g collected) |
| --- | --- | --- | --- | --- | --- |
| Comp. Ex. 8 | 0.5:1.0 | 15 | 140 | Yes | No |
| Comp. Ex. 9[1] | 0.75:1.0 | 200+ | 200+ | No | N/A |

[1]Panels coated for comparative example 9 had a very poor appearance with numerous craters and micro-blisters in the cured film.

The modified resin with the silane pigment dispersant did not result in acceptable stability of the cationic electrodepositable compositions.

Dispersant Modification for Highly Pigmented Electrocoats

Example 10 and comparative examples 11 and 12: These Ecoat baths were prepared according to the following general procedure. A stainless-steel beaker (2-liters) was loaded with 600 grams of resin II which had been warmed to 85° C. using a thermocouple and heating mantle. A 1.5-inch Cowles blade was used to agitate the resin at 2500 RPM powered by a Fawcett air motor (Model 103A). The following ingredients were added in the order listed. Specific amounts not denoted in the text are listed in table 21. To resin II was added, butyl cellosolve (48.0 g) and Dowanol PM (48.0 g) which was allowed to incorporate for five minutes. Then, the phosphoric acid derivative was added to the diluted resin, which was mixed for five minutes. Next, ASP 200 (240.0 g available from BASF) was added over five minutes. This mixture was ground for one hour after which the degree of dispersion was determined by a Hegman gauge. To be adequately dispersed, a minimal reading of 5 had to be achieved. The neutralization of the clay/resin II paste with sulfamic acid in is described for each example below.

TABLE 21

Phosphoric acid derivative dispersants

| Example | Bath P:B Ratio | Dispersant | Molecular Formula | pKa[1] at 25° C. |
|---|---|---|---|---|
| Example 10 | 0.4:1.0 | Phosphoric Acid | $H_3PO_4$ | $pKa_1 = 2.12$ $pKa_2 = 7.21$ $pKa_3 = 12.38$ |
| Comp. Ex. 11 | 0.4:1.0 | Monosodium Dihydrogen Phosphate Dihydrate | $NaH_2PO_4 \cdot 2H_2O$ | $pKa_1 = 7.21$ $pKa_2 = 12.38$ |
| Comp. Ex. 12 | 0.4:1.0 | Trisodium Phosphate Dodecahydrate | $Na_3PO_4 \cdot 12H_2O$ | N/A |

[1]Source: Chemistry the Central Science, 12$^{th}$ Edition. pKa values were derived from Ka value in Appendix D.

Example 10: 8.1 g of phosphoric acid (85 wt. % active) was used as the dispersing agent. A portion (755.3 g, 80% of the total weight) of the clay/resin paste was added to a mixture of water (325.0 g) and sulfamic acid (6.3 g) in large stainless-steel beaker to yield a 70 wt. % solids 1K feed. Deionized water was added to this 1K feed to yield a total 3800 g of electrocoat bath. Dilution of the 1K feed material with DI water and addition of tin paste was identical to the manner described in examples 2 through 7. The electrodeposition conditions to coat an L-panel for Example 10 were 225 volts/60 seconds/90° F./0.5 amps with no voltage ramp. The roughness of the cured L-panel is listed in table 22.

Comparative Example 11: 10.8 g of monosodium dihydrogen phosphate dihydrate was used as the dispersant. A portion (757.4 g, 80% of the total weight) of the clay/resin II paste was added to a mixture of water (327.3 g) and sulfamic acid (6.3 g) in large stainless-steel beaker in large stainless-steel beaker to yield a 70 wt. % solids 1K feed. Deionized water was added to this 1K feed, but water incorporation into the 1K feed failed. No viable Ecoat bath was formulated using the composition in Example 11. No panels were electrocoated.

Comparative Example 12: 25.2 g of trisodium phosphate dodecahydrate was used as the dispersant. A portion (769.0 g, 80% of the total weight) of the clay/resin paste was added to a mixture of water (332.2 g) and sulfamic acid (6.3 g) in large stainless-steel beaker in large stainless-steel beaker to yield a 70 wt. % solids 1K feed. However, neutralization of the clay/resin paste was ineffective with poor paste incorporation being observed in the acidic water. No viable Ecoat bath was formulated using the composition in Example 12. No panels were electrocoated.

TABLE 22

Summary of Phosphoric Acid Derivatives on Ecoat Bath Stability

| Example | Bath P:B Ratio | Dispersant | Viable Ecoat? | Vertical Surface Roughness (microinches) | Horizontal Surface Roughness (microinches) |
|---|---|---|---|---|---|
| Control A | 0.15:1 | — | Yes | 10 | 30 |
| Example 10 | 0.4:1.0 | $H_3PO_4$ | Yes | 12 | 56 |
| Comp. Ex. 11 | 0.4:1.0 | $NaH_2PO_4 \cdot 2H_2O$ | No | N/A | N/A |
| Comp. Ex. 12 | 0.4:1.0 | $Na_3PO_4 \cdot 12H_2O$ | No | N/A | N/A |

These examples demonstrate that the pKa of the first acidic proton of the dispersant may impact the stability of the resulting electrodepositable coating composition. As shown in Table 22, Example 10 included phosphoric acid as the dispersing agent which has a first acidic proton pKa of 2.12 and resulted in a stable composition. In contrast, Comparative Example 11 included monosodium dihydrogen phosphate dihydrate having a first acidic proton pKa of 7.21 and did not produce a viable composition. Likewise, Comparative Example 12 included trisodium phosphate dodecahydrate which does not have an acidic proton and did not result in a viable composition.

Evaluation of High PB Ecoat Resistance to Shear Stress (Pump Stability)

Control A (3800 g bath) and Example 10 (3800 g bath) were pumped for 16 hours using a Little Giant 4-MD magnetic drive pump (SKU 582002, 1/12 HP, 115V) at 95° F. After pumping, these paints were passed through a 335-mesh sieve using gravity. Then, L-panels were coated with the pumped materials as described in comparative example 1. To pass the pump test, less than 1 g of material must be collected on the mesh and the appearance of deposited films from the pre- and post-pumped paints must be similar. Table 23 summarizes the results of pump stability testing.

TABLE 23

| | | Passed 335 Mesh Sieve? (less than 1.0 g collected) | Pre Pump | | Post Pump | |
|---|---|---|---|---|---|---|
| Example | Bath P:B Ratio | | Vertical Surface Roughness (microinches) | Horizontal Surface Roughness (microinches) | Vertical Surface Roughness (microinches) | Horizontal Surface Roughness (microinches) |
| Control A | 0.15:1.0 | Yes | 10 | 30 | 10 | 23 |
| Example 10 | 0.4:1.0 | Yes | 12 | 56 | 12 | 60 |

The results in Table 23 demonstrate that Example 10 that includes phosphoric acid as the dispersing agent resulted in a composition having improved pump stability compared to Comparative Example 8 that included silane as the dispersant (see Table 2). Additionally, these results also show significantly improved L-panel appearance in view of the of Example 10 compared to the highly pigmented composition of Comparative Example 8. These results demonstrate that the pKa of the first acidic proton of the dispersing agent may be indicative of improved stabilization of a phyllosilicate pigment such as kaolin clay.

Comparison of Dispersing Agents with Different pKas on Bath Stability

Other acid dispersing agents having the pKa values indicated in Table 24 below were also investigated as potential dispersing agents.

TABLE 24

| | Acid strength of dispersing agents | | | |
|---|---|---|---|---|
| | Sulfamic Acid[1] | Oxalic Acid[2] | Citric Acid[2] | Acetic Acid[2] |
| pKa | pKa = 1.00 | $pKa_1$ = 1.23 $pKa_2$ = 4.19 | $pKa_1$ = 3.13 $pKa_2$ = 4.77 $pKa_3$ = 6.39 | pKa = 4.74 |
| Chemical Structure | $H_2N-S(=O)_2-OH$ | HOOC-COOH | Citric acid structure | $CH_3COOH$ |

[1]Source: Kirk-Othmer Encyclopedia of Chemical Technology, "Sulfamic Acid and Sulfamates". pKa value was derived from $K^a$ at 25° C.
[2]Source: Chemistry the Central Science, 12th Edition. pKa values were derived from Ka value in Appendix D at 25° C.

Comparative Examples 13 and 16 and Examples 14 and 15: These Ecoat baths were prepared according to the following general procedure. A stainless-steel beaker (2-liters) was loaded with resin II which had been warmed to 85° C. using a thermocouple and heating mantle. A 1.5-inch Cowles blade was used to agitate the resin at 2500 RPM powered by a Fawcett air motor (Model 103A). The following ingredients were added in the order listed. Specific amounts not denoted in the text are listed in Table 25. To the resin was added, butyl cellosolve which was allowed to incorporate for five minutes. Then, the dispersing agent was added to the diluted resin, which was mixed for five minutes. Next, ASP 200 kaolin clay was added over five minutes. This mixture was ground for one hour after which the degree of dispersion was determined by a Hegman gauge. To be adequately dispersed, a minimal reading of 5 had to be achieved. The neutralization of the clay/resin II paste acidic water is described in detail for each example below.

TABLE 25

Amounts of materials added to prepare Examples 13 through 16

|  | Comp. Ex. 13 | Example 14 | Example 15 | Comp. Ex. 16 |
|---|---|---|---|---|
| Ecoat Bath P:B Ratio | 0.75:1.0 | 0.4:1.0 | 0.4:1 | 0.75:1.0 |
| Dispersing Agent | Sulfamic Acid | Oxalic Acid | Citric Acid | Acetic Acid |
| Mass of Dispersing Agent (g) | 6.1 g | 13.2 g | 13.2 g | 3.7 g |
| Mass of Resin II (g) | 550.0 g | 600.0 g | 600.0 g | 520.0 g |
| Diluting Solvents | Butyl cellosolve/Water | Butyl cellosolve | Butyl cellosolve | Butyl cellosolve/Water |
| Mass of Diluting Solvent (g) | 88.0 g/60.5 g | 96.0 g | 96.0 g | 83.7 g/19.5 g |
| Mass of ASP 200 Clay | 412.5 g | 240.0 g | 240.0 g | 390.0 g |

Comparative Example 13: A portion 408.9 g (80% of the total weight) of the clay/resin II paste was added to a mixture of water (144.9 g) and sulfamic acid (2.6 g) in large stainless-steel beaker to yield a 70 wt. % solids 1K feed. Deionized water was added to this 1K feed to yield a total 3800 g of electrocoat bath. Deionized water was added to this 1K feed, but water incorporation into the 1K feed failed. No viable Ecoat bath was formulated using the composition in Example 13. No panels were electrocoated.

Example 14: A portion 759.4 g (80% of the total weight) of the clay/resin paste was added to a mixture of water (328.1 g) and sulfamic acid (6.3 g) in large stainless-steel beaker to yield a 70 wt. % solids 1K feed. Deionized water was added to this 1K feed to yield a total 3800 g of electrocoat bath. Dilution of the 1K feed material with DI water and addition of tin paste was identical to the manner described in examples 2 through 7. The pH of this composition was 3.3 and the conductivity was 982 µS/cm. This composition was used to electrocoat L-panels as previously described. The electrodeposition parameters were 140 volts/60 seconds/90° F./0.5 amps with no voltage ramp. The roughness of the cured L-panel is listed in table 26. This composition was not evaluated for shear stability (no pump test).

Example 15: A portion 759.4 g (80% of the total weight) of the clay/resin paste was added to a mixture of water (328.1 g) and sulfamic acid (6.3 g) in large stainless-steel beaker to yield a 70 wt. % solids 1K feed. Deionized water was added to this 1K feed to yield a total 3800 g of electrocoat bath. Dilution of the 1K feed materials with DI water and addition of tin paste was identical to the manner described in examples 2 through 7. The pH of this composition was 3.0 and the conductivity was 1037 µS/cm. This composition was used to electrocoat L-panels as previously described. The electrodeposition parameters were 100 volts/60 seconds/90° F./0.5 amps with no voltage ramp. The roughness of the cured L-panel is listed in table 26. This composition was not tested for shear stability (no pump test).

Comparative Example 16: A portion 813.5 g (80% of the total weight) of the clay/resin II paste was added to a mixture of water (329.4 g) and sulfamic acid (7.1 g) in large stainless-steel beaker to yield a 70 wt. % solids 1K feed. Deionized water was added to this 1K feed to yield a total 3800 g of electrocoat bath. Deionized water was added to this 1K feed; however, upon standing, copious amounts of clay fell out of dispersion. No stable composition in Example 16 could be formulated. No panels were electrocoated.

TABLE 26

Amounts of materials added to prepare Examples 11 through 14

| Example | Bath P:B Ratio | Viable Ecoat Bath? | Vertical Surface Roughness (microinches) | Horizontal Surface Roughness (microinches) |
|---|---|---|---|---|
| Comp. Ex. 13 | 0.75:1.0 | No | No panels were coated | |
| Example 14 | 0.4:1.0 | Yes | 18 | 25 |
| Example 15 | 0.4:1.0 | Yes | 20 | 140 |
| Comp. Ex. 16 | 0.75:1.0 | No | No panels were coated | |

The results in Table 26 demonstrate that dispersing agents with a first pKa between about 1.1 to about 4.6 provide better resistance to settling than dispersing agents with a higher (e.g., acetic acid, monosodium dihydrogen phosphate, silanes) or lower pKa (e.g., sulfamic acid).

Evaluation of Diluting Solvent on Bath Stability

Example 17 through 24: These electrocoat compositions were prepared according to the following general procedure. A stainless-steel beaker (2-liters) was loaded with resin II which had been warmed to 85° C. using a thermocouple and heating mantle. A 1.5-inch Cowles blade was used to agitate the resin at 2500 RPM powered by a Fawcett air motor (Model 103A). The following ingredients were added in the order listed. Specific amounts not denoted in the text are listed in Table 27. To the resin was added, diluting solvent which was allowed to incorporate for five minutes. Then, the dispersing agent (phosphoric acid) was added to the diluted resin, which was mixed for five minutes. Next, ASP 200 kaolin clay was added over five minutes. This mixture was ground for one hour after which the degree of dispersion was determined by a Hegman gauge. To be adequately dispersed, a minimal reading of 5 had to be achieved. The neutralization of the resin/clay II paste with acidic water is described in detail for each example below.

TABLE 27

Amounts of materials added to prepare Examples 17 through 23

|  | Example 17 | Example 18 | Example 19 | Example 20 | Example 21 | Example 22 | Example 23 |
|---|---|---|---|---|---|---|---|
| Ecoat Bath P:B Ratio | 0.4:1.0 | 0.5:1.0 | 0.4:1.0 | 0.4:1.0 | 0.4:1.0 | 0.4:1.0 | 0.5:1.0 |
| Mass of Resin II (g) | 600.0 g | 700.0 g | 600.0 g | 700.0 g | 700.0 g | 600.0 g | 680.0 g |
| Dispersing Agent | Phosphoric Acid | Phosphoric Acid | Phosphoric Acid | Phosphoric Acid | Phosphoric Acid | Phosphoric Acid | Phosphoric Acid |
| Mass of Dispersing Agent (g) | 8.1 g | 9.5 g | 8.1 g | 9.5 g | 9.5 g | 8.1 g | 4.6 |
| Diluting Solvent(s) | Dowanol PM | Dowanol PM | Dowanol PM/Butyl Cellosolve | TGME | Butyl carbitol | Propasol B | Dowanol PM |
| Mass of Diluting Solvent(s) (g) | 96.0 | 101.9 g | 72.0 g/24.0 g | 101.9 g | 101.9 | 96.0 g | 98.9 g |
| Mass of ASP 200 | 240.0 | 350.0 | 240.0 | 280.0 g | 280.0 g | 240.0 g | 340.0 |

Example 17: A portion 755.3 g (80% of the total weight) of the clay/resin II paste was added to a mixture of water (325.0 g) and sulfamic acid (6.3 g) in large stainless-steel beaker to yield a 70 wt. % solids 1K feed. Deionized water was added to this 1K feed to yield a total 3800 g of electrocoat bath. Dilution of the 1K feed material with DI water and addition of tin paste was identical to the manner described in examples 2 through 7. The pH of this composition was 3.4 and the conductivity was 620 μS/cm. L-panels were coated in a manner identical to comparative example 1. The electrodeposition parameters for L-panels were 250 volts/60 seconds/90° F./0.5 amps with no voltage ramp. The roughness of the cured L-panel is listed in table 28.

Example 18: A portion 812.9 g (70% of the total weight) of the clay/resin II paste was added to a mixture of water (668.0 g) and sulfamic acid (6.4 g) in large stainless-steel beaker to yield a 55 wt. % solids 1K feed. Deionized water was added to this 1K feed to yield a total 3800 g of electrocoat bath. Dilution of the 1K feed material with DI water and addition of tin paste was identical to the manner described in Examples 2 through 7. The pH of this composition was 4.23 and the conductivity was 530 μS/cm. L-panels were coated in a manner identical to comparative example 1. The electrodeposition parameters were 298 volts/60 seconds/90° F./0.5 amps with no voltage ramp. The roughness of the cured L-panel is listed in table 28.

Example 19: A portion 755.3 g (80% of the total weight) of the clay/resin II paste was added to a mixture of water (325.0 g) and sulfamic acid (6.3 g) in large stainless-steel beaker to yield a 70 wt. % solids 1K feed. Deionized water was added to this 1K feed to yield a total 3800 g of electrocoat bath. Dilution of the 1K feed material with DI water and addition of tin paste was identical to the manner described in examples 2 through 7. The pH of this composition was 3.2 and the conductivity was 595 μS/cm. L-panels were coated in a manner identical to comparative example 1. The electrodeposition parameters were 250 volts/60 seconds/90° F./0.5 amps with no voltage ramp. The roughness of the cured L-panel is listed in table 28.

Example 20: A portion 763.9 g (70% of the total weight) of the clay/resin II paste was added to a mixture of water (328.7 g) and sulfamic acid (6.4 g) in large stainless-steel beaker to yield a 70 wt. % solids 1K feed. Deionized water was added to this 1K feed to yield a total 3800 g of electrocoat bath. Dilution of the 1K feed material with DI water and addition of tin paste was identical to the manner described in examples 2 through 7. The pH of this composition was 3.59 and the conductivity was 741 μS/cm. L-panels were coated in a manner identical to comparative example 1. The electrodeposition parameters were 260 volts/60 seconds/90° F./0.5 amps with no voltage ramp. The roughness of the cured L-panel is listed in table 28.

Example 21: A portion 763.9 g (70% of the total weight) of the clay/resin II paste was added to a mixture of water (328.7 g) and sulfamic acid (6.4 g) in large stainless-steel beaker to yield a 70 wt. % solids 1K feed. Deionized water was added to this 1K feed to yield a total 3800 g of electrocoat bath. Dilution of the 1K feed material with DI water and addition of tin paste was identical to the manner described in examples 2 through 7. The pH of this composition was 3.71 and the conductivity was 799 μS/cm. L-panels were coated in a manner identical to comparative example 1. The electrodeposition parameters were 140 volts/60 seconds/90° F./0.5 amps with no voltage ramp. The roughness of the cured L-panel is listed in table 28.

Example 22: A portion 755.3 g (80% of the total weight) of the clay/resin II paste was added to a mixture of water (325.0 g) and sulfamic acid (5.5 g) in large stainless-steel beaker to yield a 70 wt. % solids 1K feed. Deionized water was added to this 1K feed to yield a total 3800 g of electrocoat bath. Dilution of the 1K feed material with DI water and addition of tin paste was identical to the manner described in examples 2 through 7. The pH of this composition was 3.9 and the conductivity was 658 μS/cm. L-panels were coated in a manner identical to comparative example 1. The electrodeposition parameters were 250 volts/60 seconds/90° F./0.5 amps with no voltage ramp. The roughness of the cured L-panel is listed in table 28.

Example 23: A portion 786.5 g (70% of the total weight) of the clay/resin II paste was added to a mixture of water (647.7 g) and sulfamic acid (6.2 g) in large stainless-steel beaker to yield a 55 wt. % solids 1K feed. Deionized water was added to this 1K feed to yield a total 3800 g of electrocoat bath. Dilution of the 1K feed material with DI water and addition of tin paste was identical to the manner described in examples 2 through 7. The pH of this composition was 4.19 and the conductivity was 504 μS/cm. L-panels were coated in a manner identical to comparative example 1. The electrodeposition parameters were 298 volts/60 seconds/90° F./0.5 amps with no voltage ramp. The roughness of the cured L-panel is listed in table 28.

Pump Stability Testing: Examples 17 through 23 (3800 g baths) were pumped for 16 hours using a Little Giant 4-MD magnetic drive pump (SKU 582002, 1/12 HP, 115V) at 95° F. After pumping these materials were passed through a 335-mesh sieve. Then, L-panels were coated with the pumped materials. To pass the pump test, less than 1 g of material must be collected on the 335-mesh sieve and the appearance of deposited films from the pre- and post-pumped paints must be similar. Table 28 summarizes the results of pump stability testing.

TABLE 28

Summary of Diluting Solvent Modifications on Ecoat Bath Stability

| Ex. | Bath P:B Ratio | Diluting Solvent | Passed 335 Mesh Sieve? (less than 1.0 g collected) | Pre Pump Vertical Surface Roughness (micro-inches) | Pre Pump Horizontal Surface Roughness (micro-inches) | Post Pump Vertical Surface Roughness (micro-inches) | Post Pump Horizontal Surface Roughness (micro-inches) |
|---|---|---|---|---|---|---|---|
| Ctrl. A | 0.15:1 | — | Yes | 10 | 30 | 10 | 23 |
| Ex. 10 | 0.4:1 | Dowanol PM/Butyl Cellosolve (1/1) | Yes | 12 | 56 | 12 | 60 |
| Ex. 17 | 0.4:1 | Dowanol PM | Yes | 10 | 30 | 10 | 40 |
| Ex. 18 | 0.5:1 | Dowanol PM | Yes | 20 | 65 | 20 | 78 |
| Ex. 19 | 0.4:1 | Dowanol PM/Butyl Cellosolve (3/1) | No (1.3 g of material collected) | 12 | 39 | 13 | 42 |
| Ex. 20 | 0.4:1 | TGME | Yes | 25 | 65 | 15 | 30 |
| Ex. 21 | 0.4:1 | Butyl Carbitol | Yes | 30 | 160 | 45 | 155 |
| Ex. 22 | 0.4:1 | Propasol B | Yes | 25 | 60 | 25 | 65 |
| Ex. 23 | 0.5:1 | Dowanol PM | Yes | 12 | 50 | 17 | 200+ |

The results in Table 28 indicate that diluting solvents with more hydrophilic groups and shorter alkyl chains generally improved anti-settling behavior (L panel roughness) and improved pump stability (e.g.: Dowanol PM and TGME vs. butyl carbitol and butyl cellosolve).

Impact of Blocking Group on Stability and pH of Final Ecoat Bath

Example 24 through 27: These Ecoat baths were prepared according to the following general procedure. A stainless-steel beaker (2-liters) was loaded with the resin specified in table 29, which had been warmed to 85° C. using a thermocouple and heating mantle. A 1.5-inch Cowles blade was used to agitate the resin at 2500 RPM powered by a Fawcett air motor (Model 103A). The following ingredients were added in the order listed. Specific amounts not denoted in the text are listed in Table 29. To the resin was added, diluting solvent which was allowed to incorporate for five minutes. Then, the dispersing agent (phosphoric acid) was added to the diluted resin, which was mixed for five minutes. Next, ASP 200 kaolin clay was added over five minutes. This mixture was ground for one hour after which the degree of dispersion was determined by a Hegman gauge. To be adequately dispersed, a minimal reading of 5 had to be achieved. The neutralization of the resin/clay paste acidic water is described in detail for each example below.

TABLE 29

Amounts of materials added to prepare Examples 24 through 27

| | Example 24 | Example 25 | Example 26 | Example 27 |
|---|---|---|---|---|
| Ecoat Bath P:B Ratio | 0.4:1 | 0.4:1 | 0.4:1 | 0.4:1 |
| Resin | Resin III | Resin IV | Resin V | Resin VI |
| Blocking Group in X-linker | TGME | TGEE | TGBE | Eastman EEH |
| Mass of Resin II (g) | 600.0 g | 600.0 g | 600.0 g | 600.0 g |
| Dispersing Agent | Phosphoric Acid | Phosphoric Acid | Phosphoric Acid | Phosphoric Acid |

TABLE 29-continued

Amounts of materials added to prepare Examples 24 through 27

|  | Example 24 | Example 25 | Example 26 | Example 27 |
|---|---|---|---|---|
| Mass of Dispersing Agent (g) | 8.1 g | 8.1 g | 8.1 g | 8.1 g |
| Diluting Solvent(s) | Dowanol PM | Dowanol PM | Dowanol PM | Dowanol PM |
| Mass of Diluting Solvent(s) (g) | 96.0 g | 96.0 g | 96.0 g | 96.0 g |
| Mass of ASP 200 | 240.0 g | 240.0 g | 240.0 g | 240.0 g |

Example 24: A portion 755.3 g (80% of the total weight) of the clay/resin III paste was added to a mixture of water (755.3 g) and sulfamic acid (6.3 g) in large stainless-steel beaker to yield a 70 wt. % solids 1K feed. Deionized water was added to this 1K feed to yield a total 3800 g of electrocoat bath. Dilution of the 1K feed material with DI water and addition of tin paste was identical to the manner described in examples 2 through 7. The pH of this composition was 5.34 and the conductivity was 483 µS/cm.

Example 25: A portion 755.3 g (80% of the total weight) of the clay/resin IV paste was added to a mixture of water (755.3 g) and sulfamic acid (6.3 g) in large stainless-steel beaker to yield a 70 wt. % solids 1K feed. Deionized water was added to this 1K feed to yield a total 3800 g of electrocoat bath. Dilution of the 1K feed material with DI water and addition of tin paste was identical to the manner described in examples 2 through 7. The pH of this composition was 3.72 and the conductivity was 342 µS/cm.

Example 26: A portion 748.0 g (80% of the total weight) of the clay/resin V paste was added to a mixture of water (325.0 g) and sulfamic acid (6.2 g) in large stainless-steel beaker to yield a 70 wt. % solids 1K feed. Deionized water was added to this 1K feed to yield a total 3800 g of electrocoat bath. Dilution of the 1K feed material with DI water and addition of tin paste was identical to the manner described in examples 2 through 7. The pH of this composition was 5.02 and the conductivity was 871 µS/cm.

Example 27: A portion 755.3 g (80% of the total weight) of the clay/resin VI paste was added to a mixture of water (755.3 g) and sulfamic acid (6.3 g) in large stainless-steel beaker to yield a 70 wt. % solids 1K feed. Deionized water was added to this 1K feed to yield a total 3800 g of electrocoat bath. Dilution of the 1K feed material with DI water and addition of tin paste was identical to the manner described in examples 2 through 7. The pH of this composition was 4.32 and the conductivity was 659 µS/cm.

TABLE 30

The Impact of Blocking Group Alcohol in Cross Linker on Final Bath pH

|  | Example 20 | Example 24 | Example 25 | Example 26 | Example 27 |
|---|---|---|---|---|---|
| Ecoat Bath P:B Ratio | 0.4:1 | 0.4:1 | 0.4:1 | 0.4:1 | 0.4:1 |
| Resin | Resin II | Resin III | Resin IV | Resin V | Resin VI |
| Bath pH at 20 wt. % Solids | 3.4 | 5.34 | 5.02 | 3.72 | 4.32 |

The results in Table 30 indicate that the blocking group of the curing agent may impact the bath pH which could manipulate bath stability in combination with the dispersing agent. The less hydrophobic material (TGME and TGEE) have the highest pH by at least half a pH unit.

Example 28: A stainless steel beaker (2-liters) was loaded with 523.5 grams of resin VII (above) and 126.5 grams of crosslinker VII (above) which had been warmed to 85° C. using thermocouple and heating mantle. A 1.5-inch Cowles blade was used to agitate the resin at 2500 RPM powered by a Fawcett air motor (Model 103A). Dowanol PM (94.3 grams) and then Phosphoric acid (85% aq, 6.1 g) and then DI water (74.8 g) were added to Resin VII, which was then mixed for ten minutes. Next, ASP 200 (487.5 g available from BASF) was added over five minutes. This mixture was ground for one hour after which the degree of dispersion was determined by a Hegman gauge. To be adequately dispersed, a minimal reading of 5 had to be achieved. A portion (918.8 g, 70% of the total weight) of the clay/resin paste was added to a mixture of water (1012.8 g) and sulfamic acid (6.12 g) in large stainless steel beaker to yield a 45 wt. % solids 1K feed. Deionized water was added to this 1K feed to yield a total 3800 g of electrocoat bath. Dilution of the 1K feed material with DI water and addition of tin paste was identical to the manner described in examples 2 through 7. Butyl Carbitol Formal (45.5 g) was then added to the bath and the bath was allowed to mix under mild agitation for 24 hours. The final bath had a pH of 5.01 and a P:B ratio of 0.75:1.

Control C: This electrocoat is commercially available as a 1K feed from PPG under the name POWERCRON 590-534 (product code: CF590-534). Deionized water (2312.6 g) was added to 1487.4 g of CF590-534 under agitation for one hour. This material was then used to electrocoat panels. The P:B of this paint was 0.15:1.0. Control C was used according to the technical bulletin.

Evaluation of Example 28 and Control C Bath Stability: CRS panels pretreated with zinc phosphate (C700 item: 28630 available from ACT, Hillsdale, MI) were cut in half to yield a 4" by 6" panel. Then, 0.25 inches was removed from each side of the panel resulting in a panel that was 3.5" by 6", which was bent into an "L" shape yielding a 4-in vertical surface and 2-inch horizontal surface. This panel was submerged in the electrocoat and agitation was stopped. After three minutes of sitting in the unagitated bath, electrodeposition began. A rectifier (Xantrax Model XFR600-2, Elkhart, Indiana, or Sorensen XG 300-5.6, Ameteck, Berwyn, Pennsylvania) which was DC-power supplied was used to apply the electrodepositable coating. The target film build was 0.5 to 0.7 mils (12.7 to 17.8 microns) on the vertical face. This film thickness was deposited by using the voltage/temperature/current conditions for a DFT of 25.4 microns (two minute condition), but for one minute. Exact coating conditions for each paint are found in the table below. After panels were electrocoated, these panels were rinsed with deionized water and baked at 350° F. for 30 minutes in an electric oven (Despatch Model LFD-1-42). The roughness of the horizontal and vertical surfaces were measured using a Precision Surtronic 25 Profilometer available from Taylor Hobson. The instrument was referenced using 3-inch silicon wafer available from Ted Pella Inc. (Product Number 16013), which had a roughness of 1.0±0.7 microinches after 10 repeat measurements

TABLE 31

Comparison of electrodeposition conditions and cured film roughness

| Example | Voltage (V) | Current (amps) | Time (minutes) | Bath Temp. (° F.) | Vertical Surface Roughness (microinches) | Horizontal Surface Roughness (microinches) |
|---|---|---|---|---|---|---|
| Example 28 (0.75 P/B) | 210 V | 0.5 | 1.0 | 90 | 14 | 55 |
| Control C (0.15 P/B) | 150 V | 0.5 | 1.0 | 90 | 10 | 30 |

As demonstrated in highly pigmented Example 28, a similar ratio of vertical to horizontal appearance can be achieved in a highly pigmented system using a diol-blocked crosslinker. This is desired because electrodepositable coating compositions are often applied to parts with complex shapes that have both horizontal and vertical surfaces. The appearance should be roughly similar no matter the orientation of the surface to be coated.

Example 29: A stainless steel beaker (2-liters) was loaded with 428.6 grams of resin VII (above) and 40.9 grams of crosslinker VII (above) which had been warmed to 85° C. using thermocouple and heating mantle. A 1.5-inch Cowles blade was used to agitate the resin at 2500 RPM powered by a Fawcett air motor (Model 103A). Phosphoric acid (85% aq, 3.8 g) and then DI water (46 g) were added to the mixture of Resin VII and crosslinker VII, which was then mixed for ten minutes. Next, ASP 200 (800.0 g available from BASF) was added in 100 gram increments. Between incremental additions of ASP 200, Dowanol PM was added. The total amount of Dowanol PM added was 120 grams. This mixture was ground for one hour. A portion (923.5 g, 70% of the total weight) of the clay/resin paste was added to a mixture of water (482.9 g) and sulfamic acid (3.72 g) in large stainless steel beaker that had been heated to 60° C. Deionized water was added to this 1K feed to yield a total 3800 g of electrocoat bath. Dilution of the 1K feed material with DI water and addition of tin paste was identical to the manner described in examples 2 through 7. The final bath had a pH of 5.08 and a P:B ratio of 2.0:1.

Example 29 demonstrates that the blocking group of the curing agent may impact the bath pH which could manipulate bath stability in combination with the dispersing agent even at a very high pigment loading content.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. A cationic electrodepositable coating composition comprising a cationic electrodepositable binder; and a phyllosilicate pigment-dispersing agent complex, wherein the complex has an anionic charge and the phyllosilicate pigment of the phyllosilicate pigment-dispersing agent complex comprises chlorite, serpentine, kaolin clay or a combination thereof.

2. The cationic electrodepositable coating composition of claim 1, wherein the phyllosilicate pigment comprises kaolin clay.

3. The cationic electrodepositable coating composition of claim 1, wherein the dispersing agent comprises a dispersing acid, and the phyllosilicate pigment-dispersing agent complex comprises a phyllosilicate pigment-dispersing acid complex.

4. The cationic electrodepositable coating composition of claim 3, wherein the dispersing acid comprises an oxyacid of phosphorus, a carboxylic acid, an oxyacid of sulfur, or a combination thereof.

5. The cationic electrodepositable coating composition of claim 3, wherein the dispersing acid comprises a first acidic proton having a pKa of 1.1 to 4.6.

6. The cationic electrodepositable coating composition of claim 3, wherein the dispersing acid comprises phosphoric acid, and the phyllosilicate pigment-dispersing agent complex comprises a phyllosilicate pigment-phosphoric acid complex.

7. A cationic electrodepositable coating composition comprising a cationic electrodepositable binder; and a phyllosilicate pigment-dispersing agent complex, wherein the complex has an anionic charge, and wherein the ratio of the weight of phyllosilicate pigment to moles of dispersing agent is 0.25 to 25 g/mmol.

8. The cationic electrodepositable coating composition of claim 1, wherein the pigment-to-binder (P:B) ratio of the phyllosilicate pigment to the cationic electrodepositable binder is 0.2:1 to 2.0:1.

9. The cationic electrodepositable coating composition of claim 1, wherein the dispersing agent is present in an amount of 0.1% to 10% by weight, based on the total solids weight of the composition.

10. The cationic electrodepositable coating composition of claim 1, wherein the cationic electrodepositable binder comprises a cationic salt group-containing, film-forming polymer.

11. The cationic electrodepositable coating composition of claim 10, wherein the cationic salt group-containing, film-forming polymer comprises active hydrogen functional groups, and the cationic salt group-containing, film-forming polymer comprises an active hydrogen-containing, cationic salt group-containing, film-forming polymer.

12. The cationic electrodepositable coating composition of claim 1, wherein the cationic electrodepositable binder further comprises a curing agent comprising an at least partially blocked polyisocyanate, an aminoplast resin, a phenoplast resin, or a combination thereof.

13. The cationic electrodepositable coating composition of claim 12, wherein the at least partially blocked polyisocyanate is blocked with a blocking agent comprising the structure:

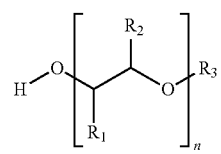

wherein $R_1$ and $R_2$ are each hydrogen or one of the $R_1$ and $R_2$ is hydrogen and the other is a methyl group; $R_3$ is H or a $C_1$ to $C_4$ alkyl group; and n is an integer from 1-50.

14. The cationic electrodepositable coating composition of claim 12, wherein the curing agent comprises a high molecular weight volatile group.

15. The cationic electrodepositable coating composition of claim 10, wherein the cationic salt group-containing, film-forming polymer is present in the cationic electrodepositable coating composition in an amount of 40% to 90% by weight, and further comprising a curing agent present in the cationic electrodepositable coating composition in an amount of 10% to 60% by weight, based on the total weight of the resin solids of the cationic electrodepositable coating composition.

16. The cationic electrodepositable coating composition of claim 1, further comprising an aqueous medium comprising water and optionally one or more organic solvents.

17. The cationic electrodepositable coating composition of claim 1, further comprising an aqueous medium comprising water and one or more organic solvents wherein the organic solvent comprises the structure:

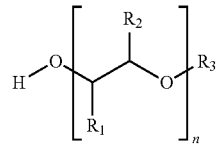

wherein $R_1$ and $R_2$ are each hydrogen or one of the $R_1$ and $R_2$ is hydrogen and the other is a methyl group; $R_3$ is H or a $C_1$ to $C_4$ alkyl group; and n is an integer from 1-50.

18. The cationic electrodepositable coating composition of claim 1, wherein the cationic electrodepositable coating composition has a pH of 3.0 to 6.5.

19. A method for coating a substrate comprising electrodepositing a coating derived from the cationic electrodepositable coating composition of claim 1 onto at least a portion of the substrate.

20. A substrate that is coated, at least in part, with a coating deposited from the cationic electrodepositable coating composition of claim 1.

21. A coating formed by depositing a coating from the cationic electrodepositable coating composition of claim 1 onto a substrate, wherein the cationic electrodepositable binder is in an at least partially cured state.

22. The cationic electrodepositable coating composition of claim 1, wherein the cationic electrodepositable coating composition is substantially free of grind resin.

* * * * *